(12) United States Patent
Luebke et al.

(10) Patent No.: US 7,599,324 B2
(45) Date of Patent: Oct. 6, 2009

(54) SYSTEM, METHOD AND WIRELESS NODE DETERMINING IF IN RANGE OR OUT OF RANGE OF WIRELESS COMMUNICATION WITH A SERVER

(75) Inventors: Charles J. Luebke, Sussex, WI (US); Michael L. McManus, Oakdale, PA (US)

(73) Assignee: Eaton Corporation, Cleveland, OH (US)

( * ) Notice: Subject to any disclaimer, the term of this patent is extended or adjusted under 35 U.S.C. 154(b) by 500 days.

(21) Appl. No.: 11/325,588

(22) Filed: Jan. 4, 2006

(65) Prior Publication Data

US 2006/0199541 A1 Sep. 7, 2006

Related U.S. Application Data

(63) Continuation-in-part of application No. 11/070,869, filed on Mar. 2, 2005.

(51) Int. Cl.
*H04Q 7/00* (2006.01)
(52) U.S. Cl. ..................................................... 370/328
(58) Field of Classification Search .................. 370/328
See application file for complete search history.

(56) References Cited

U.S. PATENT DOCUMENTS

| 5,608,378 | A | 3/1997 | McLean et al. |
| 6,420,969 | B1 | 7/2002 | Campbell |
| 6,662,642 | B2 | 12/2003 | Breed et al. |
| 2005/0057359 | A1* | 3/2005 | Coffey et al. ........ 340/539.21 |
| 2006/0049922 | A1* | 3/2006 | Kolpasky et al. ....... 340/426.13 |

* cited by examiner

*Primary Examiner*—Nick Corsaro
*Assistant Examiner*—Eric Elcenko
(74) *Attorney, Agent, or Firm*—Martin J. Moran

(57) ABSTRACT

A wireless system includes a headless base station having a first wireless communication port, a fob having a user input device, a display and a second wireless communication port structured to communicate with the first wireless communication port of the base station, and various wireless nodes different than the fob. The wireless nodes include a sensor node, a device node and a range extender node. The wireless nodes have a third wireless communication port structured to send information to or receive information from the first wireless communication port of the base station. The fob is structured to respond to the user input device and determine if the fob is in range or out of range of wireless communication with the base station.

4 Claims, 15 Drawing Sheets

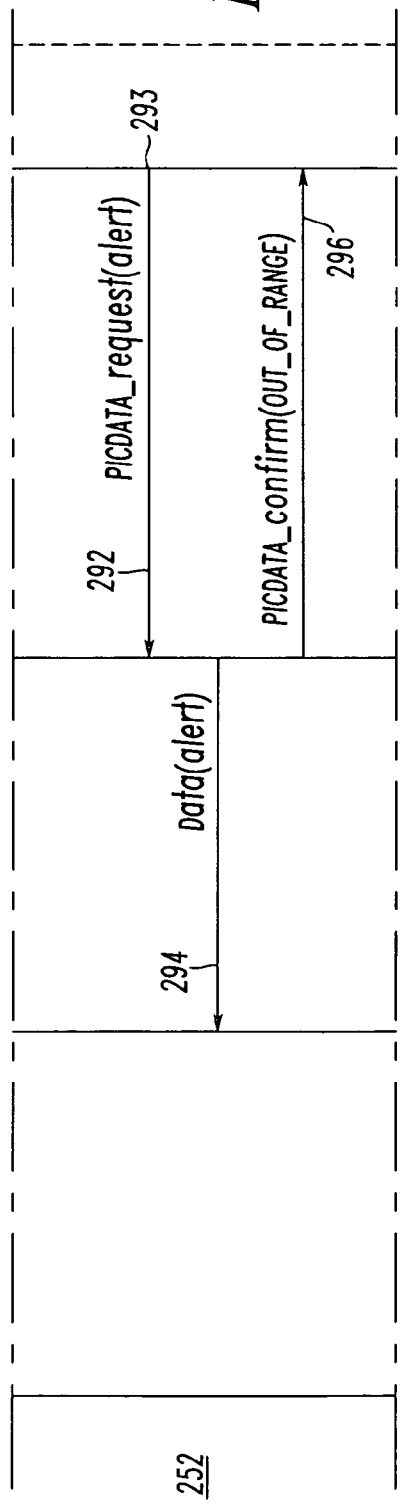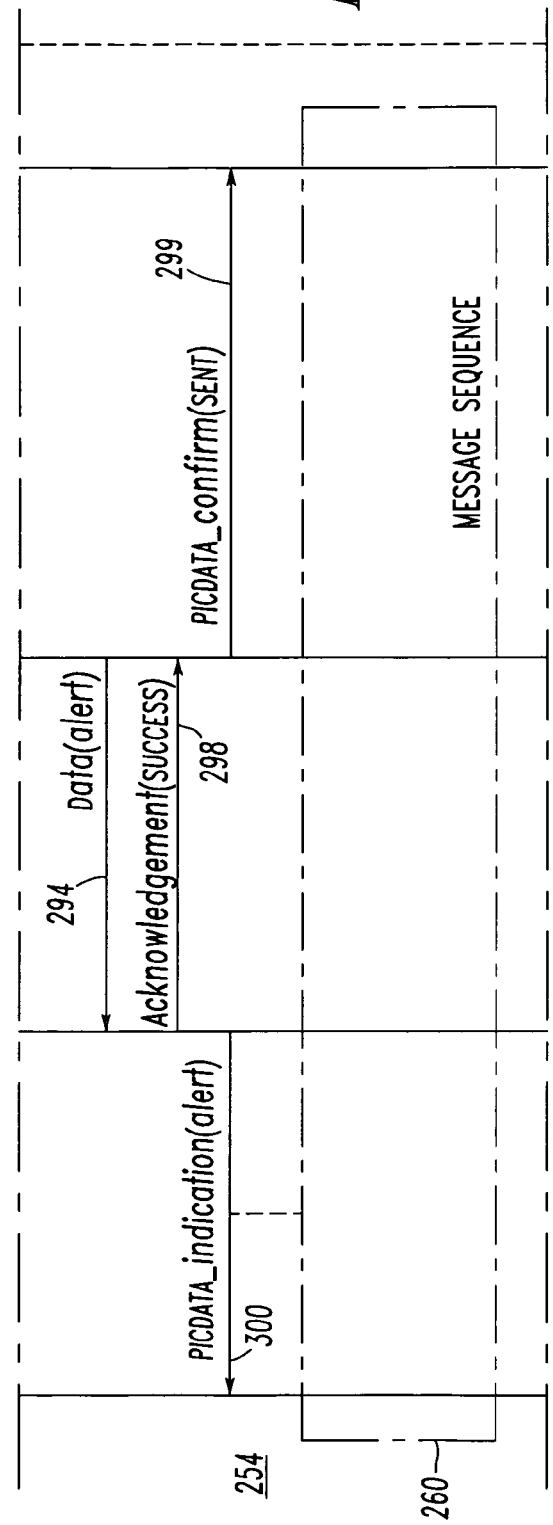

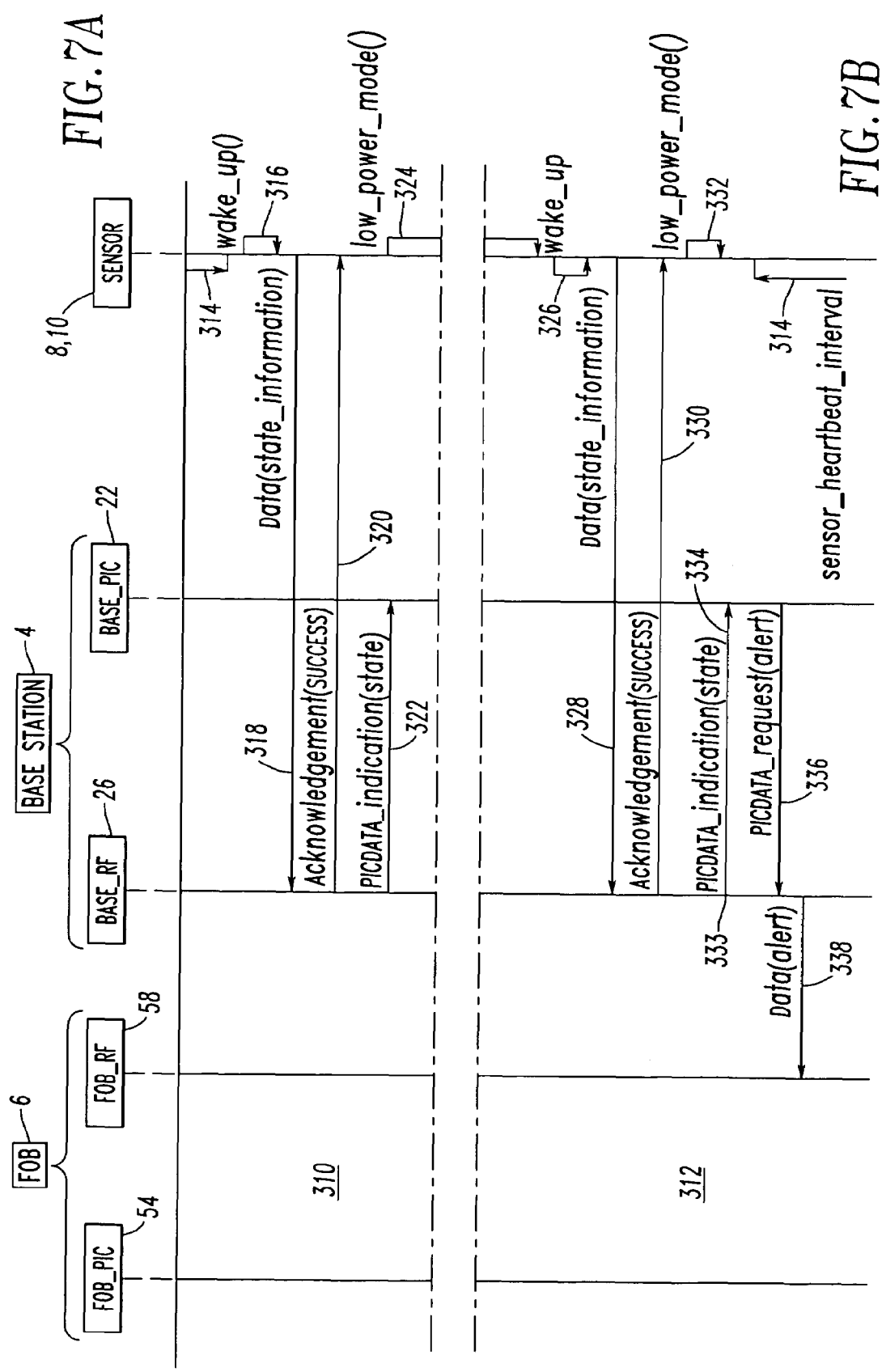

SYSTEM, METHOD AND WIRELESS NODE DETERMINING IF IN RANGE OR OUT OF RANGE OF WIRELESS COMMUNICATION WITH A SERVER

This application is a continuation-in-part of application Ser. No. 11/070,869, filed Mar. 2, 2005, and entitled "Home System And Method Of Determining If A Fob Is In Range Or Out Of Range Of Wireless Communication With A Server".

CROSS-REFERENCE TO RELATED APPLICATIONS

This application is related to commonly assigned:

U.S. patent application Ser. No. 10/686,187, filed Oct. 15, 2003, entitled "Home System Including A Portable Fob Having A Display";

U.S. patent application Ser. No. 10/686,179, filed Oct. 15, 2003, entitled "Home System Including A Portable Fob Having A Rotary Menu And A Display"; and U.S. patent application Ser. No. 10/686,016, filed Oct. 15, 2003, entitled "Home System Including A Portable Fob Mating With System Components".

BACKGROUND OF THE INVENTION

1. Field of the Invention

This invention relates generally to systems and, more particularly, to wireless systems employing a server and wireless nodes, such as input sensors and/or output devices. The invention also relates to wireless nodes and methods for wireless communication in a wireless system.

2. Background Information

Wireless communication networks are an emerging new technology, which allows users to access information and services electronically, regardless of their geographic position.

All nodes in ad-hoc networks are potentially mobile and can be connected dynamically in an arbitrary manner. All nodes of these networks behave as routers and take part in discovery and maintenance of routes to other nodes in the network. For example, ad-hoc networks are very useful in emergency search-and-rescue operations, meetings or conventions in which persons wish to quickly share information, and in data acquisition operations in inhospitable terrains.

An ad-hoc mobile communication network comprises a plurality of mobile hosts, each of which is able to communicate with its neighboring mobile hosts, which are a single hop away. In such a network, each mobile host acts as a router forwarding packets of information from one mobile host to another. These mobile hosts communicate with each other over a wireless media, typically without any infra-structured (or wired) network component support.

In contrast to wired networks, mesh-type, low rate-wireless personal area network (LR-WPAN) wireless communication networks are intended to be relatively low power, to be self-configuring, and to not require any communication infrastructure (e.g., wires) other than power sources.

Relatively low power, radio frequency (RF) lighting control systems employ wall-mounted, battery powered, RF switch "sensors". Such a sensor sends a signal to a remote power control device, such as relay, in order to turn one or more house lights on and off.

It is known to provide a sensor system in which a plurality of sensors are connected, either directly with wires or indirectly with RF communications, to a central control and monitoring device. An example of such a sensor system is a security system, which may include a telephone line for dial out/in communication.

At the time of installation, it is often difficult to determine if wireless sensors and other wireless nodes are located within range of a wireless network or within range of the wireless server or wireless base station thereof.

There is room for improvement in systems employing wireless communication. There is also room for improvement in wireless nodes and in methods of wireless communication.

SUMMARY OF THE INVENTION

These needs and others are met by the present invention, which provides a wireless node, such as, for example, a fob, including a "range finding" function or mode that enables a user to take the fob to a location within a wireless network, such as the location or the proposed location of another wireless node, such as a wireless sensor, and easily determine if the fob is in range or out of range of wireless communication with a wireless server, such as a wireless base station.

As one aspect of the invention, a system comprises: a server comprising a first wireless communication port; a fob comprising a user input device, a display and a second wireless communication port structured to communicate with the first wireless communication port of the server; and at least one node different than the fob, the at least one node being at least one of a sensor node, a device node and a range extender node, the at least one node comprising a third wireless communication port structured to send information to or receive information from the first wireless communication port of the server, wherein the fob is structured to respond to the user input device and determine if the fob is in range or out of range of wireless communication with the server.

The fob may be further structured to display a status corresponding to the in range or out of range determination on the display.

The fob may be further structured to display a first status corresponding to the in range determination when the fob directly wirelessly communicates with the server, display a second status corresponding to the in range determination when the fob indirectly wirelessly communicates with the server, and display a third status corresponding to the out of range determination.

The fob may be further structured to respond to the user input device and re-determine if the fob is in range or out of range of wireless communication with the server.

The fob may be further structured to send a first wireless message to the server and to responsively receive a second wireless message from the server within a predetermined time in order to provide the in range determination.

The fob may be further structured to send a first wireless message to the server through one of the at least one node and to responsively receive a second wireless message from the server through one of the at least one node within a predetermined time in order to provide the in range determination.

As another aspect of the invention, a wireless node is structured to wirelessly communicate with a wireless server or at least one node different than the wireless node. The wireless node comprises: a user input device; a display; a processor; and a wireless communication port structured to communicate with the wireless server or the at least one node, wherein the processor is structured to respond to the user input device and determine if the wireless node is in range or out of range of wireless communication with the wireless server.

As another aspect of the invention, a method of determining if a wireless node is in range or out of range of wireless communication with a server comprises: receiving input from a user input device; sending a first wireless message to the server responsive to the received input; and attempting to receive a second wireless message from the server within a predetermined time after the sending a first wireless message to the server and responsively determining if the wireless node is in range or out of range of wireless communication with the server.

The method may further comprise failing to receive the second wireless message, broadcasting a third wireless message, receiving a fourth wireless message responsive to the third wireless message, sending a fifth wireless message to the server through another wireless node responsive to the fourth wireless message, and attempting to receive a sixth wireless message from the server within a predetermined time after the sending the fifth wireless message to the server and responsively determining if the wireless node is in range or out of range of wireless communication with the server.

BRIEF DESCRIPTION OF THE DRAWINGS

A full understanding of the invention can be gained from the following description of the preferred embodiments when read in conjunction with the accompanying drawings in which:

FIGS. 6A-6C are message flow diagrams showing the interaction between the fob and the base station for sending data and alerts to the fob of FIG. 1.

FIGS. 7A-7B are message flow diagrams showing the interaction between one of the sensors and the base station of FIG. 1 for monitoring that sensor.

DESCRIPTION OF THE PREFERRED EMBODIMENTS

Figure 1:
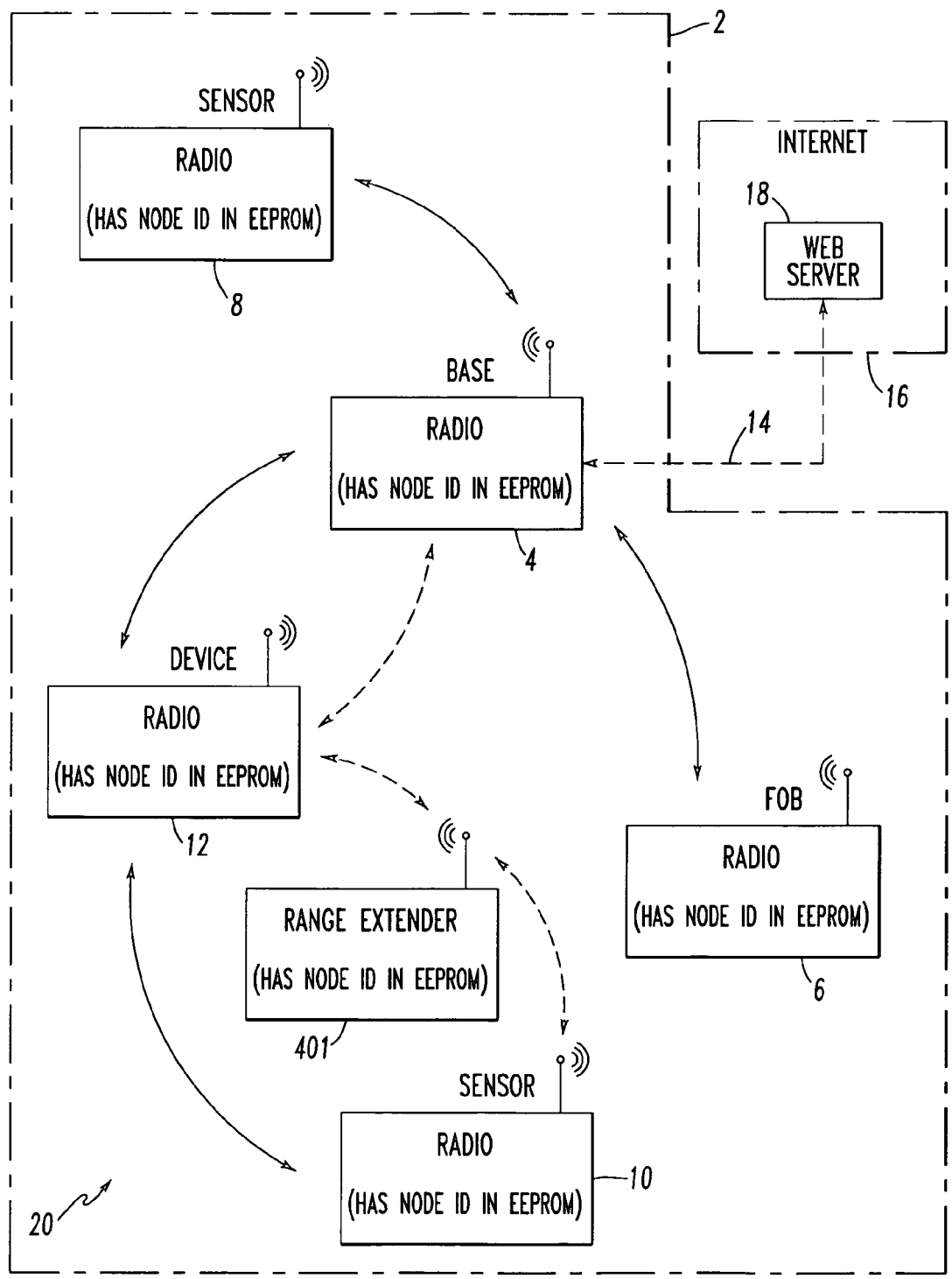
FIG. 1 is a block diagram of a home wellness system.

As employed herein, the term "wireless" shall expressly include, but not be limited by, radio frequency (RF), infrared, IrDA, wireless area networks, IEEE 802.11 (e.g., 802.11a; 802.11b; 802.11g), IEEE 802.15 (e.g., 802.15.1; 802.15.3, 802.15.4), other wireless communication standards (e.g., without limitation, ZigBee™ Alliance standard), DECT, PWT, pager, PCS, Wi-Fi, Bluetooth™, and cellular.

As employed herein, the term "communication network" shall expressly include, but not be limited by, any local area network (LAN), wide area network (WAN), intranet, extranet, global communication network, the Internet, and/or wireless communication network.

As employed herein, the term "portable wireless communicating device" shall expressly include, but not be limited by, any portable communicating device having a wireless communication port (e.g., without limitation, a portable wireless device; a portable personal computer (PC); a Personal Digital Assistant (PDA); a data phone).

As employed herein, the term "fob" shall expressly include, but not be limited by, a portable wireless communicating device; handheld portable communicating device having a wireless communication port (e.g., without limitation, a handheld wireless device; a handheld personal computer (PC); a Personal Digital Assistant (PDA); a wireless network device; a wireless object that is directly or indirectly carried by a person; a wireless object that is worn by a person; a wireless object that is placed on or coupled to a household object (e.g., a refrigerator; a table); a wireless object that is coupled to or carried by a personal object (e.g., a purse; a wallet; a credit card case); a portable wireless object; and/or a handheld wireless object.

As employed herein, the term "network coordinator" (NC) shall expressly include, but not be limited by, any communicating device, which operates as the coordinator for devices wanting to join a communication network and/or as a central controller in a wireless communication network.

As employed herein, the term "network device" (ND) shall expressly include, but not be limited by, any communicating device (e.g., without limitation, a portable wireless communicating device; a fob; a camera/sensor device; a wireless camera; a control device; and/or a fixed wireless communicating device, such as, for example, switch sensors, motion sensors or temperature sensors as employed in a wirelessly enabled sensor network), which participates in a wireless communication network, and which is not a network coordinator.

As employed herein, the term "node" includes NDs and NCs.

As employed herein, the term "headless" means without any user input device and without any display device.

As employed herein, the term "server" shall expressly include, but not be limited by, a "headless" base station; and/or a network coordinator.

As employed herein, the term "system" shall expressly include, but not be limited by, a system for a home or other type of residence or other type of structure, or a system for a land vehicle, a marine vehicle, an air vehicle or another motor vehicle.

As employed herein, the term "system for a structure" shall expressly include, but not be limited by, a system for a home or other type of residence or other type of structure.

As employed herein, the term "system for a vehicle" shall expressly include, but not be limited by, a system for a land vehicle, a marine vehicle, an air vehicle or another motor vehicle.

As employed herein, the term "residence" shall expressly include, but not be limited by, a home, apartment, dwelling, office and/or place where a person or persons reside(s) and/or work(s).

As employed herein, the term "structure" shall expressly include, but not be limited by, a home, apartment, dwelling, garage, office building, commercial building, industrial building, a roofed and/or walled structure built for permanent or temporary use, a structure for a land vehicle, a structure for a marine vehicle, a structure for an air vehicle, or a structure for another motor vehicle.

As employed herein, the term "land vehicle" shall expressly include, but not be limited by, any land-based vehicles having pneumatic tires, any rail-based vehicles, any maglev vehicles, automobiles, cars, trucks, station wagons, sport-utility vehicles (SUVs), recreational vehicles, all-terrain vehicles, vans, buses, motorcycles, mopeds, campers, trailers, or bicycles.

As employed herein, the term "marine vehicle" shall expressly include, but not be limited by, any water-based vehicles, ships, boats, other vessels for travel on water, submarines, or other vessels for travel under water.

As employed herein, the term "air vehicle" shall expressly include, but not be limited by, any air-based vehicles, airplanes, jets, aircraft, airships, balloons, blimps, or dirigibles.

As employed herein, the terms "home wellness system" or "wellness system" or "awareness system" shall expressly include, but not be limited by, a system for monitoring and/or configuring and/or controlling aspects of a home or other type of residence or other type of structure.

As employed herein, the term "user input device" shall expressly include, but not be limited by, any suitable transducer (e.g., without limitation, a rotary encoder; a joystick; a micro-joystick; a touchpad, which emulates a rotary encoder; a VersaPad OEM input pad marketed by Interlink Electronics, Inc. of Camarillo, Calif.), which collects user input through direct physical manipulation, with or without employing any moving part(s), and which converts such input, either directly or indirectly through an associated processor and/or converter, into a corresponding digital form.

As employed herein, the term "processor" shall expressly include, but not be limited by, any processing component with or without input(s) (e.g., without limitation, a user input device; an analog or digital input) and/or output(s) (e.g., without limitation, a display).

As employed herein, the term "mains-powered" refers to any node, which has continuous power capabilities (e.g., powered from an AC outlet or AC receptacle or AC power source; AC/DC powered devices; rechargeable battery powered devices; other rechargeable devices), but excluding non-rechargeable battery powered devices.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

The present invention is described in association with a wireless home wellness or awareness system, although the invention is applicable to a wide range of wireless systems, including wireless nodes, for monitoring and/or configuring and/or controlling aspects of a structure.

FIG. 1 is a block diagram of a wireless home wellness system 2. The system 2 includes a "headless" RF base station 4, a portable RF fob or "house key" 6, a plurality of RF sensors, such as 8,10, and one or more RF output devices, such as 12 (only one device 12 is shown in FIG. 1). The RF base station 4 may include a suitable link 14 (e.g., telephone; DSL; Ethernet) to the Internet 16 and, thus, to a web server 18. The sensors 8,10 may include, for example, the analog sensor 8 and the on/off digital detector 10. The device 12 may include, for example, a water valve and/or a wide range of output devices. The sensors 8,10, device 12, base station 4 and fob 6 all employ relatively short distance, relatively very low power, RF communications. These components 4,6,8,10,12 form a wireless network 20 in which the node ID for each of such components is unique and preferably is stored in a suitable non-volatile memory, such as EEPROM, on each such component.

The base station 4 (e.g., a wireless web server; a network coordinator) may collect data from the sensors 8,10 and "page," or otherwise send an RF alert message to, the fob 6 in the event that a critical status changes at one or more of such sensors.

The fob 6 may be employed as both a portable in-home monitor for the various sensors 8,10 and device 12, also, as a portable configuration tool for the base station 4 and such sensors and such device, and, further, as a remote control for such device.

The example base station 4 is headless and includes no user interface. Alternatively, the invention is applicable to servers, such as base stations, having a local or remote user interface. The sensors 8,10 preferably include no user interface, although some sensors may have a status indicator (e.g., an LED (not shown)). The user interface functions are provided by the fob 6 as will be discussed in greater detail, below. As shown with the device 12, the network 20 preferably employs an adhoc, multihop capability, in which the sensors 8,10, the device 12 and the fob 6 do not have to be within range of the base station 4, in order to communicate.

Figure 2A:
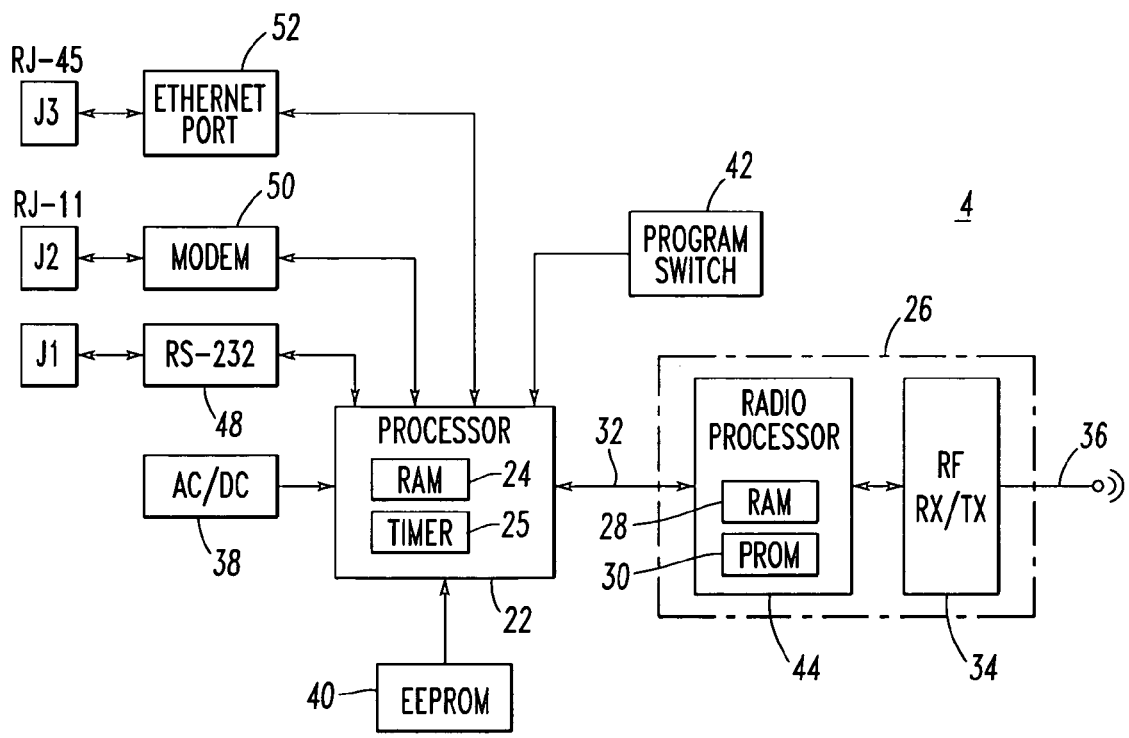
FIG. 2A is a block diagram of the base station of FIG. 1.

FIG. 2A shows the base station 4 of FIG. 1. The base station 4 includes a suitable first processor 22 (e.g., PIC® model 18F2320, marketed by Microchip Technology Inc. of Chandler, Ariz.; model Atmel ATmega64 marketed by Atmel Corporation of San Jose, Calif.), having RAM memory 24 and a suitable second radio or RF processor 26 having RAM 28 and PROM 30 memory. The first and second processors 22,26 communicate through a suitable serial interface (e.g., SCI; SPI) 32. The second processor 26, in turn, employs an RF transceiver (RX/TX) 34 having an external antenna 36. As shown with the processor 22, the various base station components receive power from a suitable AC/DC power supply 38. The first processor 22 receives inputs from a timer 25 and a program switch 42 (e.g., which detects mating or engagement with the fob 6 of FIG. 1). The EEPROM memory 40 is employed to store the unique ID of the base station 4 as well as other nonvolatile information such as, for example, the unique IDs of other components, which are part of the wireless network 20, and other configuration related information. The second processor 26 may be, for example, a CC1010 RF Transceiver or model CC2420 marketed by Chipcon AS of Oslo, Norway. The processor 26 incorporates a suitable microcontroller core 44, the relatively very low-power RF transceiver 34, and hardware DES encryption/decryption (not shown).

Figure 2B:
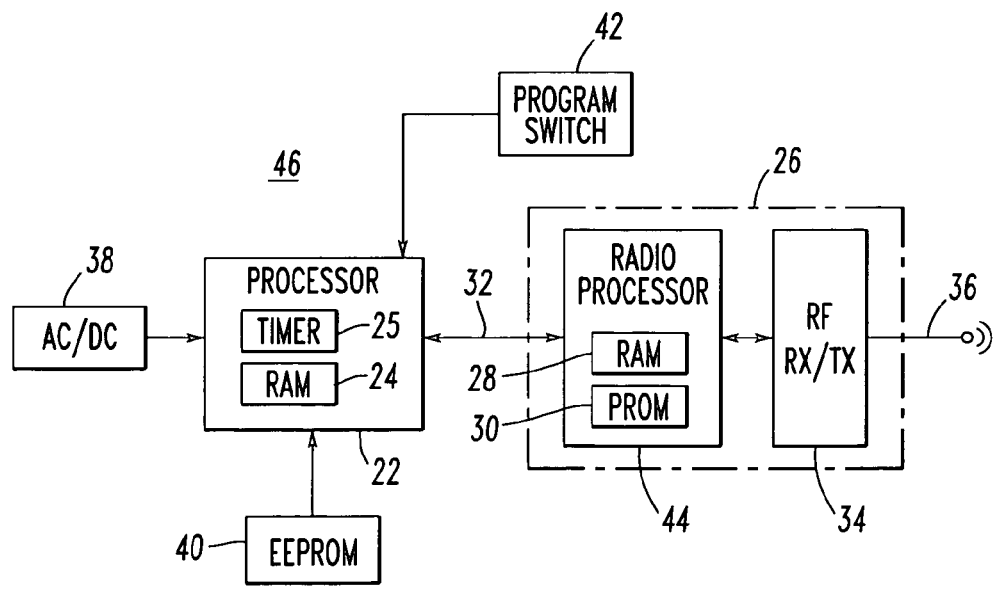
FIG. 2B is a block diagram of another base station.

FIG. 2B is a block diagram of another base station 46. The base station 4 of FIG. 2A is similar to the base station 46 of FIG. 2B, except that it also includes one or more interfaces 48,50,52 to a personal computer (PC) (not shown), a telephone line (not shown) and a network, such as an Ethernet local area network (LAN) (not shown). In this example, the PIC processor 22 communicates with a local PC through a suitable RS-232 interface 48 and connector J1, with a telephone line through a suitable modem 50 and connector J2, and with an Ethernet LAN through an Ethernet port 52 and connector J3. Hence, the modem 50 may facilitate communications with a remote cellular telephone, other portable electronic device (e.g., a PDA (not shown)) or a remote service provider (not shown), and the Ethernet port 52 may provide communications with the Internet 16 of FIG. 1 and, thus, with a remote PC or other client device (not shown).

Figure 3:
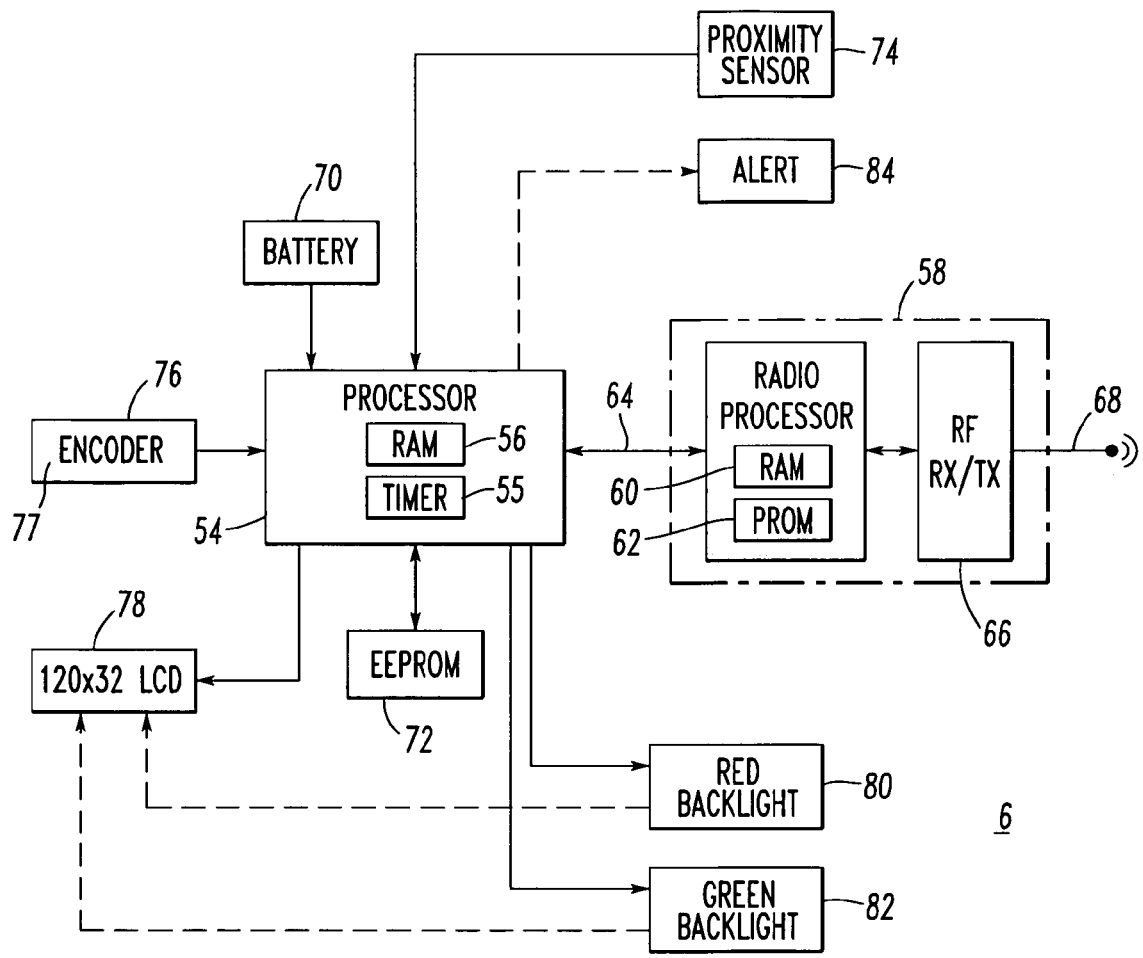
FIG. 3 is a block diagram of the fob of FIG. 1.

FIG. 3 is a block diagram of the fob 6 of FIG. 1. The fob 6 includes a suitable first processor 54 (e.g., PIC; Atmel) having RAM memory 56 and a suitable second radio or RF processor 58 having RAM 60 and PROM 62 memory. The first and second processors 54,58 communicate through suitable serial interface (e.g., SCI; SPI) 64. The EEPROM memory 72 is employed to store the unique ID of the fob 6 as well as other nonvolatile information. For example, there may be a nonvolatile storage for icons, character/font sets and sensor labels (e.g., the base station 4 sends a message indicating that an on/off sensor or device is ready to configure, and the fob 6 looks up the on/off sensor or device and finds a predefined list of names to choose from). This expedites a relatively rapid interaction. The fob 6 may also employ a short term memory cache (not shown) that is used when the fob 6 is out of range of the base station 4. This stores the list of known sensors and devices and their last two states. This permits the user, even if away, to review, for example, what door was open or what valve was closed, when the fob 6 was last in range.

The second processor 58, in turn, employs an RF transceiver (RX/TX) 66 having an external antenna 68. As shown with the processor 54, the various components of the fob 6 receive power from a battery 70. The first processor 54 receives inputs from a timer 55, a suitable proximity sensor, such as a sensor/base/device program switch 74 (e.g., which detects mating or engagement with one of the sensors 8,10 or with the device 12 or with the base station 4 of FIG. 1), and a user input device, such as, for example, the exemplary encoder 76 or rotary selector/switch, such as a thumbwheel encoder. Typically, such encoder 76 also includes a button 77, through which the user presses, clicks and/or double-clicks to initiate actions through the fob user interface. The first processor 54 also sends outputs to a suitable display 78 (e.g., a 120×32 LCD), one or more visual alerts, such as a red backlight 80 (e.g., an alert is present) and a green backlight 82 (e.g., no alert is present) for the display 78, and an alert device 84 (e.g., a suitable audible, visual or vibrating device providing, for example, a sound, tone, buzzer, vibration or flashing light).

The program switch 74 may be, for example, an ESE-24MH1T Panasonic® two-pole detector switch or a Panasonic® EVQ-11U04M one-pole micro-switch. This program switch 74 includes an external pivotable or linear actuator (not shown), which may be toggled in one of two directions (e.g., pivoted clockwise and counter-clockwise; in and out), in order to close one of one or two normally open contacts (not shown). Such a two-pole detector is advantageous in applications in which the fob 6 is swiped to engage the sensors 8,10, the device 12 or the base station 4. Hence, by monitoring one of those contacts, when the fob 6 is swiped in one linear direction (e.g., without limitation, right to left, or left to right), the corresponding contact is momentarily closed, without concern for overtravel of the corresponding engagement surface (not shown). Similarly, by monitoring the other of those contacts, when the fob 6 is swiped in the other linear direction (e.g., without limitation, left to right, or right to left), the corresponding contact is momentarily closed and another suitable action (e.g., a diagnostic function; a suitable action in response to removal of the fob 6; a removal of a component from the network 20; an indication to enter a different configuration or run mode) may be undertaken.

Although a physical switch 74 is disclosed, an "optical" switch (not shown) may be employed, which is activated when the fob 6, or portion thereof, "breaks" an optical beam when mating with another system component. Alternatively, any suitable device or sensor (e.g., a reed switch and a magnet) may be employed to detect that the fob 6 has engaged or is suitably proximate to another system component, such as the base station 4 or sensors 8,10 or device 12 of FIG. 1.

The encoder 76 may be, for example, an AEC11BR series encoder marketed by CUI Inc. of Beaverton, Oreg. Although the encoder 76 is shown, any suitable user input device (e.g., a combined rotary switch and pushbutton; touch pad; joystick button) may be employed. Although the alert device 84 is shown, any suitable annunciator (e.g., an audible generator to generate one or more audible tones to alert the user of one or more corresponding status changes; a vibrational generator to alert the user by sense of feel; a visual indicator, such as, for example, an LED indicator to alert the user of a corresponding status change) may be employed. The display 78 preferably provides both streaming alerts to the user as well as optional information messages.

Figure 4:
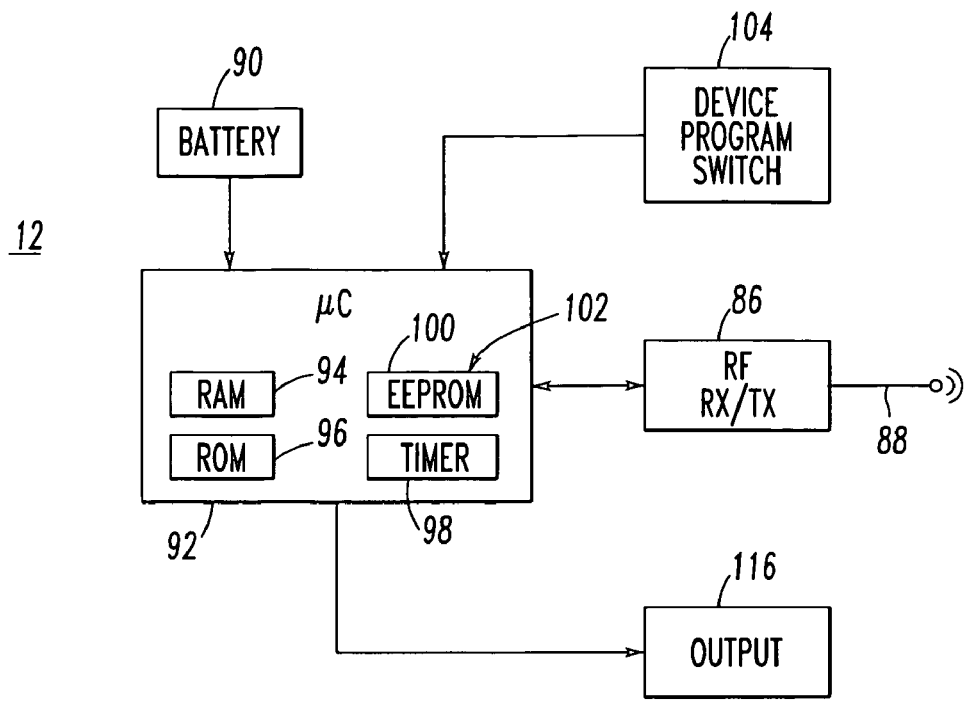
FIG. 4 is a block diagram of the control device of FIG. 1.
Figure 5:
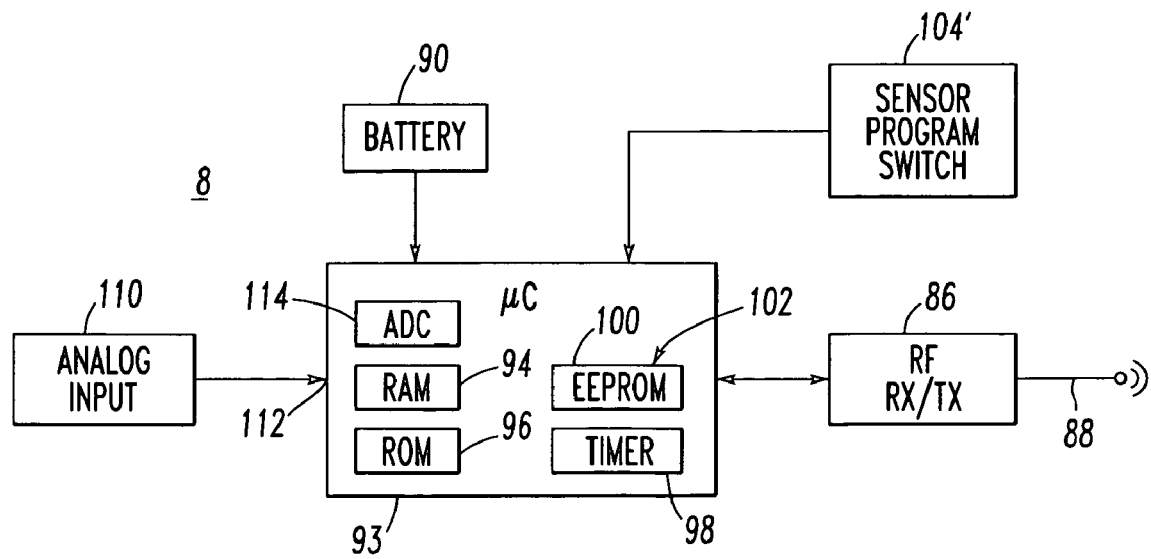
FIG. 5 is a block diagram of one of the input sensors of FIG. 1.

FIGS. 4 and 5 are block diagrams of the device 12 and the analog sensor 8, respectively, of FIG. 1. Each of the device 12 and the sensor 8 includes an RF transceiver (RF RX/TX) 86 having an external antenna 88, a battery 90 for powering the various sensor components, a suitable processor, such as a microcontroller (μC) 92 or 93 having RAM 94, ROM 96, a timer 98 (e.g., in order to provide, for example, a periodic wake-up of the corresponding μC 92 or 93, in order to periodically send device or sensor status information back to the base station 4 of FIG. 1) and other memory (e.g., EEPROM 100 including the unique ID 102 of the component which is stored therein during manufacturing), and a device or sensor program switch 104,104' for mating with the fob program switch 74 of FIG. 3.

Alternatively, the device 12 may be powered from a suitable AC/DC power source (not shown). The device 12 of FIG. 4 includes a suitable control output 116 (e.g., adapted to open and/or close a water valve). Other non-limiting examples of devices (i.e., output nodes), such as 12, include water valves (shut off; turn on), gas valves (shut off; turn on), electrical switches (power shut off; power turn on), generator (shut off; turn on), garage door (open; close), deadbolt lock (lock; unlock), thermostat (set setpoint), appliance electrical switches (appliance power shut off; appliance power turn on), light switches (shut off lights; turn on lights), communication "firewall" control (enable or secure; disable or insecure), relay device (normally open contact; normally close contact), X10 gateway (enable; disable), camera trigger (trigger snapshot), and water sprinkler (turn on; turn off).

When a sensor (input node) (e.g., water sensor), such as 8,10, joins the wireless network 20 of FIG. 1, the user is prompted by the fob 6 to: (1) select a name for the sensor (e.g., washer; water heater; basement); (2) indicate what event or state change will trigger an alert by the base station 4 (e.g., water present; water absent); and (3) the form of alert (e.g., display message on fob 6; audible tone on fob 6; vibration on fob 6; remote telephone call (e.g., through link 14 of FIG. 1); remote e-mail message (e.g., through link 14 of FIG. 1)).

When a device (output node) (e.g., water valve), such as 12, joins the wireless network 20, the user is prompted by the fob 6 to: (1) select a name for the device (e.g., main water shut off valve; water heater valve); (2) select which of the sensors (or other nodes, such as, for example, fob; pager; cellular telephone; PDA; wireless handheld device), such as 8,10, can control it; and (3) configure any logic (e.g., OR; AND; XOR) to be used for multiple sensor or fob inputs. For example, the first time that any device is added to the system 2 of FIG. 1, the user is automatically taken through fob training menus (not shown), in order to confirm the device name, define the critical control state of the device, select the controller(s), and select the alert method.

The analog sensor 8 of FIG. 5 includes a physical analog input interface 110 (e.g., a water detector) with the µC 93 employing an analog input 112 and a corresponding analog-to-digital converter (ADC) 114.

The device 12 of FIG. 4 and the sensor 8 of FIG. 5 do not include an indicator. It will be appreciated, however, that one or both of such device and sensor may employ an indicator (e.g., to show that a battery 90 is OK; to show that the analog value from the ADC 114 is within an acceptable range of values; to show an on/off input or output state).

Figure 6A:
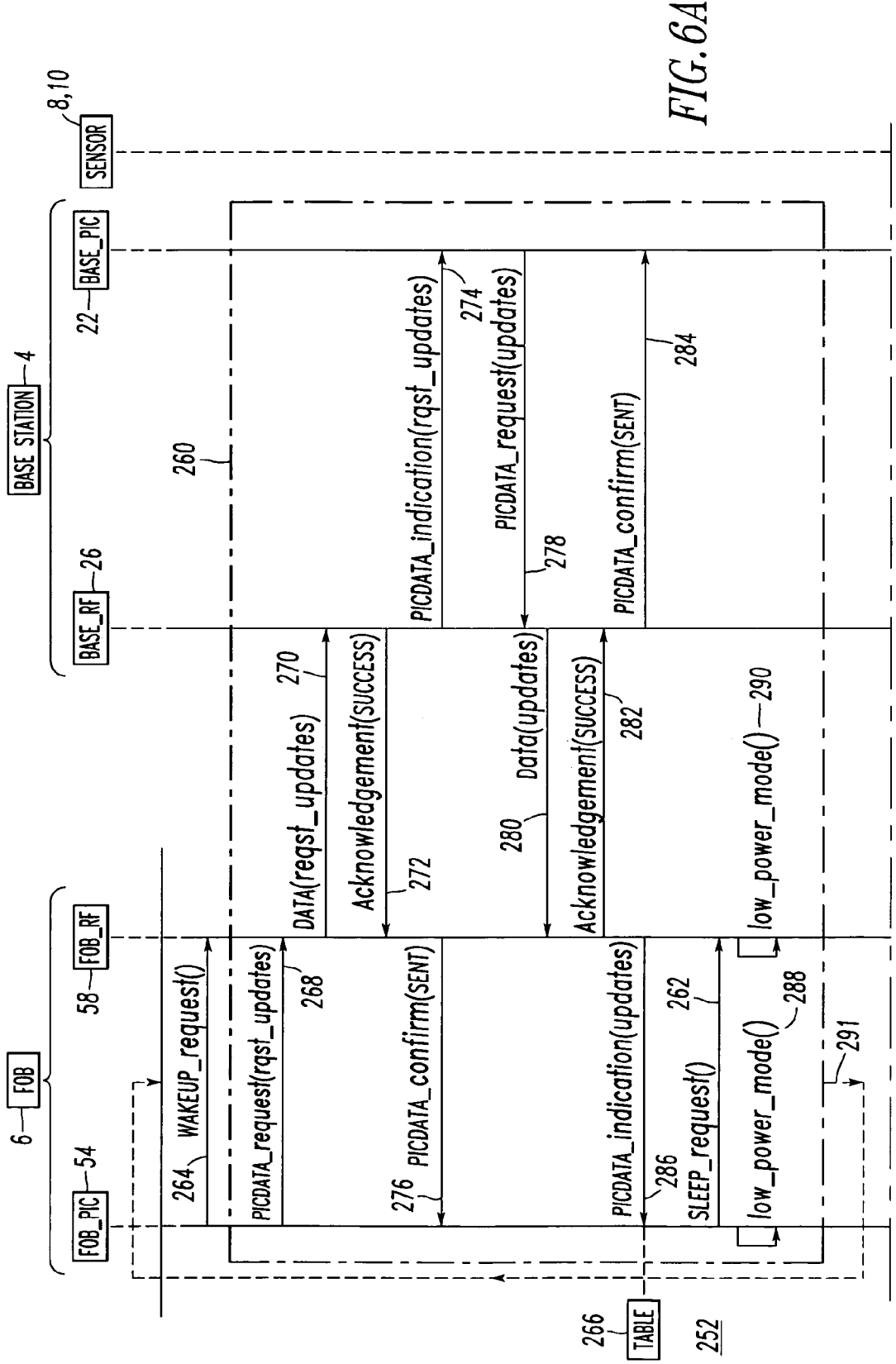

FIGS. 6A and 6B are message flow diagrams 252 and 254, respectively, showing various messages between the base station 4 and the fob 6 for monitoring the sensors 8,10 of FIG. 1 and for sending data and alerts to such fob. FIG. 6A shows that the fob 6 requests and receives information from the base station 4. Preferably, those requests (only one request is shown) are initiated at regular (e.g., periodic) intervals. FIG. 6B shows that the base station 4 may also send a message to the fob 6 in response to a state change of one of the sensors 8,10. In this example, the fob 6 is out of range of the base station 4. As shown in FIGS. 2A-2B, 3 and 6A-6B, the base station 4 includes both a PIC processor 22 and an RF processor 26, and the fob 6 includes both a PIC processor 54 and an RF processor 58. It will be appreciated, however, that such components may alternatively employ one or more suitable processors.

As shown in FIG. 6A, the fob 6 periodically requests and receives information from the base station 4. At the end of the message sequence 260, the fob PIC processor 54 sends a SLEEP_request( ) 262 to the fob RF processor 58. Then, after a suitable sleep interval to conserve battery power (e.g., one minute), the fob PIC processor 54 is woken by the fob timer 55 of FIG. 3, and the fob PIC processor 54 sends a WAKEUP_ request( ) message 264 to the fob RF processor 58. In turn, the message sequence 260 is executed to refresh the local fob data table 266 with the most recent available information from base station 4 concerning the sensors 8,10.

As part of the message sequence 260, the fob PIC processor 54 sends a PICDATA_request(rqst_updates) message 268 to the fob RF processor 58, which receives that message 268 and responsively sends a Data(reqst_updates) RF message 270 to the base RF processor 26. Upon receipt of the RF message 270, the base RF processor 26 sends an Acknowledgement (SUCCESS) RF message 272 back to the fob RF processor 58 and sends a PICDATA_indication(rqst_updates) message 274 to the base PIC processor 22. The data requested by this message 274 may include, for example, profile and state information from one or more components, such as the sensors 8,10 and the device 12 (FIG. 1). Here, the fob 6 is requesting an update from the base PIC processor 22 for data from all of the sensors 8,10, including any newly added sensor (not shown), in view of that state change (i.e., there is new data from the newly added sensor). Responsive to receiving the Acknowledgement(SUCCESS) RF message 272, the fob RF processor 58 sends a PICDATA_confirm(SENT) message 276 to the fob PIC processor 54. Responsive to receiving the PICDATA_indication(rqst_updates) message 274, the base PIC processor 22 sends a PICDATA_request(updates) message 278 to the base RF processor 26, which receives that message 278 and responsively sends a Data(updates) RF message 280 to the fob RF processor 58.

After receiving the Data(updates) RF message 280, the fob RF processor 58 sends an Acknowledgement(SUCCESS) RF message 282 back to the base RF processor 26 and sends a PICDATA_indication(updates) message 286, including the requested sensor update data, to the fob PIC processor 54, which updates its local data table 266. Then, if there is no activity of the fob encoder 76 of FIG. 3, or if no alert is received from the base station 4, then the fob PIC processor 54 sends a SLEEP_request( ) message 262 to the fob RF processor 58 and both fob processors 54,58 enter a low_power-er_mode( ) 288,290, respectively.

After receiving the Acknowledgement(SUCCESS) RF message 282, the base RF processor 26 sends a PICDATA_ confirm(SENT) message 284 back to the base PIC processor 22. Following the message sequence 260, the fob timer 55 awakens the fob PIC processor 54, at 291, which sends the message 264 to the fob RF processor 58, in order to periodically repeat the message sequence 260.

FIG. 6B shows an alert message sequence from the base station 4 to the fob 6, in which the fob 6 is out of range of the base station 4. First, at 293, the base station PIC processor 22 sends a PICDATA_request(alert) message 292 to the base station RF processor 26. In response, that processor 26 sends a Data(alert) RF message 294 to the fob RF processor 58. In this example, any RF message sent by the base station 4 while the fob 6 is out of range (or in low power mode) will be lost. After a suitable time out period, the base station RF processor 26 detects the non-response by the fob 6 and responsively sends a PICDATA_confirm(OUT_OF_RANGE) message 296 back to the base station PIC processor 22.

In the example of FIG. 6C, which begins with the Data (alert) RF message 294 (FIG. 6B) to the fob RF processor 58, the fob 6 is in range of the base station 4. The fob RF processor 58 receives the RF message 294 and responsively sends an Acknowledgement(SUCCESS) RF message 298 back to the base RF processor 26. Upon receipt of the RF message 298, the base RF processor 26 sends a PICDATA_confirm(SENT) message 299 to the base PIC processor 22. Then, after the fob RF processor 58 sends the RF message 299, it sends a PIC-DATA_indication(alert) message 300 to the fob PIC processor 54. Next, the message sequence 260 of FIG. 6A is executed to provide sensor information to the fob 6.

FIGS. 7A and 7B are message flow diagrams 310,312 showing various messages between one of the sensors 8,10 and the base station 4 of FIG. 1 for monitoring that sensor. FIG. 7A shows that the sensor sends state information to the base station 4 at regular (e.g., periodic) intervals. FIG. 7B shows that the sensor also sends state information to the base station 4 in response to sensor state changes. The sensor timer 98 of FIG. 5 preferably establishes the regular interval, sensor_heartbeat_interval 314 of FIGS. 7A-7B (e.g., without limitation, once per minute; once per hour; once per day; any suitable time period), for that particular sensor, such as 8,10. It will be appreciated that the regular intervals for the various sensors 8,10 may be the same or may be different depending upon the desired update interval for each particular sensor.

In FIG. 7A, after the expiration of the sensor_heartbeat _ interval 314, the sensor, such as 10, wakes up (wake_up( )) at 316. Next, the sensor 10 sends a Data(state_information) RF message 318 to the base station RF processor 26, and that RF processor 26 responsively sends an Acknowledgement(SUC-CESS) RF message 320 back to the sensor 10. Responsive to receiving that message 320, the sensor 10 enters a low_pow-er_mode( ) 324 (e.g., in order to conserve power of the sensor battery 90 of FIG. 5). Also, responsive to sending that message 320, the base station RF processor 26 sends a PIC-DATA_indication(state) message 322 to the base station PIC processor 22. Both of the Data(state_information) RF message 318 and the PICDATA_indication(state) message 322 convey the state of the sensor 10 (e.g., sensor on/off; sensor battery OK/low).

The low_power_mode( ) 324 is maintained until one of two events occurs. As was previously discussed, after the expiration of the sensor_heartbeat_interval 314, the sensor 10 wakes up at 316. Alternatively, as shown in FIG. 7B, the sensor 10 wakes up (wake_up( ) 326) in response to a state change (e.g., the on/off digital detector 10 (FIG. 1) detects an on to off transition or an off to on transition of the sensor discrete input (not shown); the analog sensor 8 (FIG. 5) determines a suitable change of its analog input 110). Next, the sensor 10 sends a Data(state_information) RF message 328 to the base station RF processor 26, and that RF processor 26 responsively sends an Acknowledgement(SUCCESS) RF message 330 back to the sensor 10. Responsive to receiving that message 330, the sensor 10 enters a low_power_mode( ) 332. After the expiration of the sensor_heartbeat_interval 314, the sensor 10 wakes up at 316 of FIG. 7A. Next, at 333, the base station RF processor 26 responsively sends a PIC-DATA_indication(state) message 334 to the base station PIC processor 22. Both of the Data(state_information) RF message 328 and the PICDATA_indication(state) message 334 convey the state of the sensor 10. Responsive to receiving that message 334, the base station PIC processor 22 sends a PIC-DATA_request(alert) message 336 to the base station RF processor 26. Such an alert is sent whenever there is any sensor state change. Finally, the base station RF processor 26 sends a Data(alert) RF message 338 to the fob RF processor 58. The response by that processor 58, if the fob 6 is in range, and the subsequent activity by the fob 6 are discussed, above, in connection with FIG. 6C. Otherwise, if the fob 6 is out of range, the subsequent activity by the base station 4 is discussed, above, in connection with FIG. 6B.

EXAMPLE 1

Figure 8:
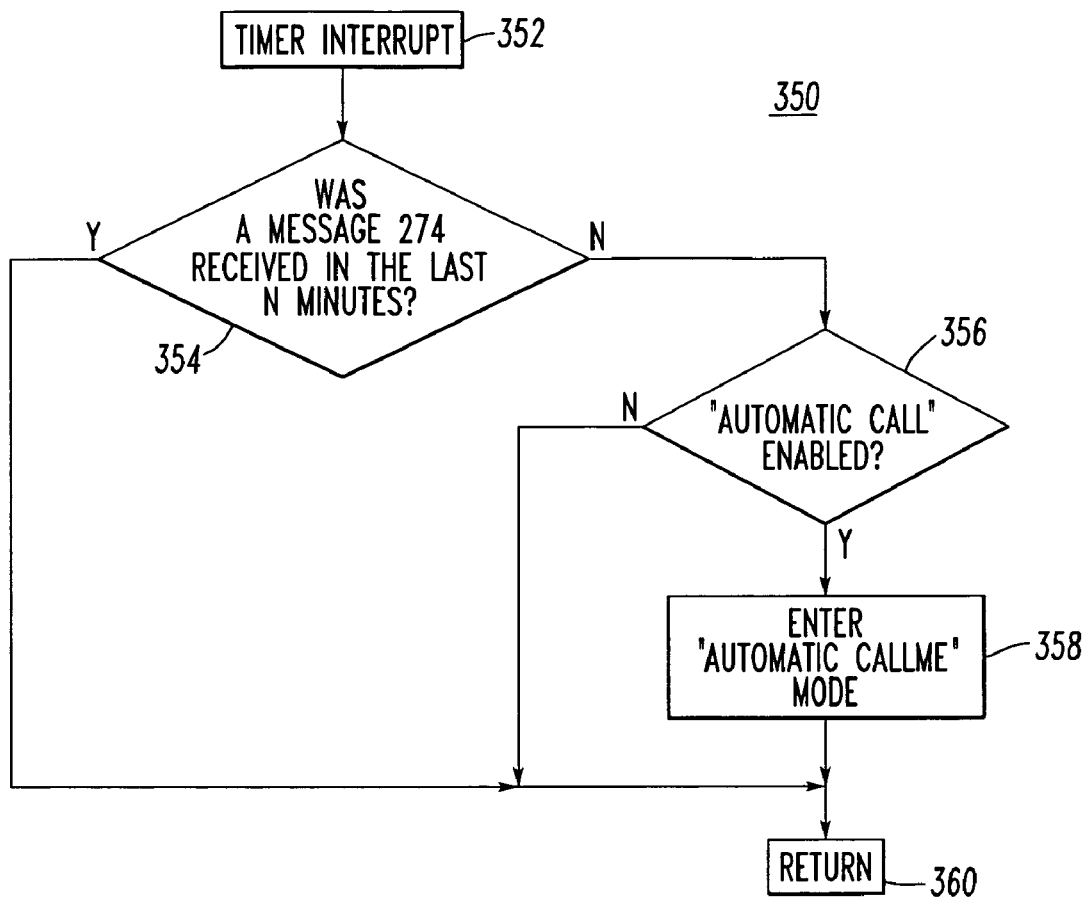
FIG. 8 is a flowchart of software executed by the base station of FIG. 1.

FIG. 8 shows a flowchart of a software routine 350 executed by the base PIC processor 22 of FIG. 2A. For range-based automatic arming and disarming of one or more functions of the system 2 of FIG. 1, the base station 4 knows that the fob 6 is out of range by, for example, detecting whether a periodic fob message (such as RF message 270 or message 274 of FIG. 6A) was received in a predetermined time interval (e.g., a suitable time). For example, the fob 6 sends the periodic (or heartbeat) RF message 270 to the base station 4 about, for example, once a minute (or faster). If the base station 4 does not hear from the fob 6 in, for example, three heartbeats or within three minutes, then it changes over to an "automatic callme" mode.

In this example, there is a single fob, such as fob 6 of FIG. 1. First, at 352, the base PIC processor 22 responds to a periodic interrupt (e.g., without limitation, about once a minute; any suitable time) from its timer 25 of FIG. 2A. At 354, it is determined if the last message 274 of FIG. 6A was received in a predetermined time interval (e.g., within any suitable time; within the last N minutes; within the last 3 minutes). If so, then the routine 350 returns at 360. Otherwise, at 356, it is determined if an "automatic call" mode was enabled. If not, then the routine 350 returns at 360. Otherwise, at 358, the "automatic callme" mode is entered at 358 before the routine 350 returns at 360.

EXAMPLE 2

In response to detecting that the fob 6 is out of range, the base station 4 discontinues the fob alerts, such as 294 of FIG. 6B, and begins to send alerts, for example, through a non-wireless communication port, such as, for example, to the modem 50 (FIG. 2A) or to a Universal Serial Bus (USB) channel (not shown) in the "automatic callme" mode 358 of FIG. 8.

EXAMPLE 3

As an alternative to Example 1, any suitable algorithm (e.g., evaluation of the RF signal strength of the fob 6) may be employed by the base station 4 to detect that the fob 6 is out of range of the base station.

EXAMPLE 4

The fob 6 can determine that the base station 4 does not acknowledge or respond to its periodic RF message 270 of FIG. 6A and, thus, may conclude after one or more of such failed attempts that the fob 6 is out of range of the base station 4. In turn, the fob 6 may annunciate a suitable alert 84 (FIG. 3) (e.g., play a suitable "switching to callme" tone).

EXAMPLE 5

Figure 9:
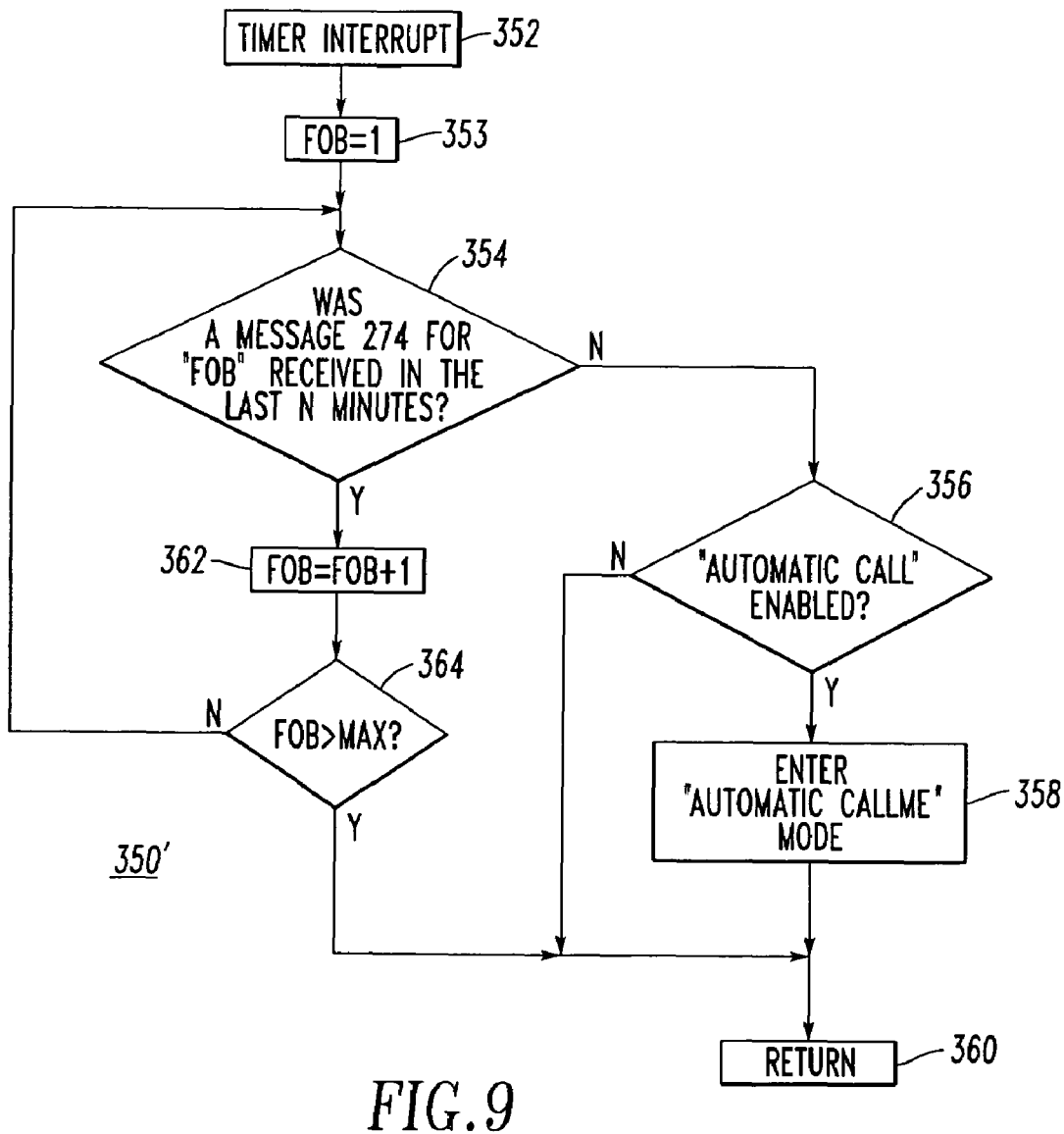
FIG. 9 is a flowchart of software executed by the base station of FIG. 1.

FIG. 9 shows a flowchart of a software routine 350' executed by the base PIC processor 22 of FIG. 2A. This algorithm may be applied on a per system basis and the user may determine whether they want to shift into the "automatic callme" mode 358 (FIGS. 8 and 9) when "any" fob, such as fobs 6,6A,6B of FIG. 1, is missing or is out of range of the base station 4. Example 6, below, covers the case when "all" fobs are missing or out of range. The default is "any" to be safe.

As was discussed above in connection with Example 2, in response to detecting that any fob is out of range, the base station 4 begins to send alerts, for example, to the modem 50 (FIG. 2A) or to the USB channel (not shown) in the "automatic callme" mode 358.

The routine 350' is similar to the routine 350 of FIG. 8. Prior to 354, a variable FOB is set to one at 353. If the last message 274 of FIG. 6A was received in the predetermined time interval for the particular fob, then the variable FOB is incremented at 362. Then, at 364, if the variable FOB does not exceed a maximum value (e.g., MAX=three for the example three fobs 6,6A,6B of FIG. 1), then step 354 is repeated. Otherwise, the routine 350' returns at 360.

EXAMPLE 6

As an alternative to Example 5, the base station 4 shifts into the "automatic callme" mode 358 when "all" fobs, such as all of the fobs 6,6A,6B of FIG. 1, are missing or out of range of the base station 4.

EXAMPLE 7

In addition to any of Examples 1-6, above, in response to detecting that the fob 6 is out of range, the base station 4 may cause, for example, one or more doors to be auto-locked and/or one or more lights or appliances to be turned off through one or more corresponding output devices, such as 12 of FIG. 1. Hence, the fob's range from the base station 4 may drive a critical control function, such as, for example, locking a door. The messages associated with an example control function are discussed, below, in connection with FIG. 12.

EXAMPLE 8

Figure 10:
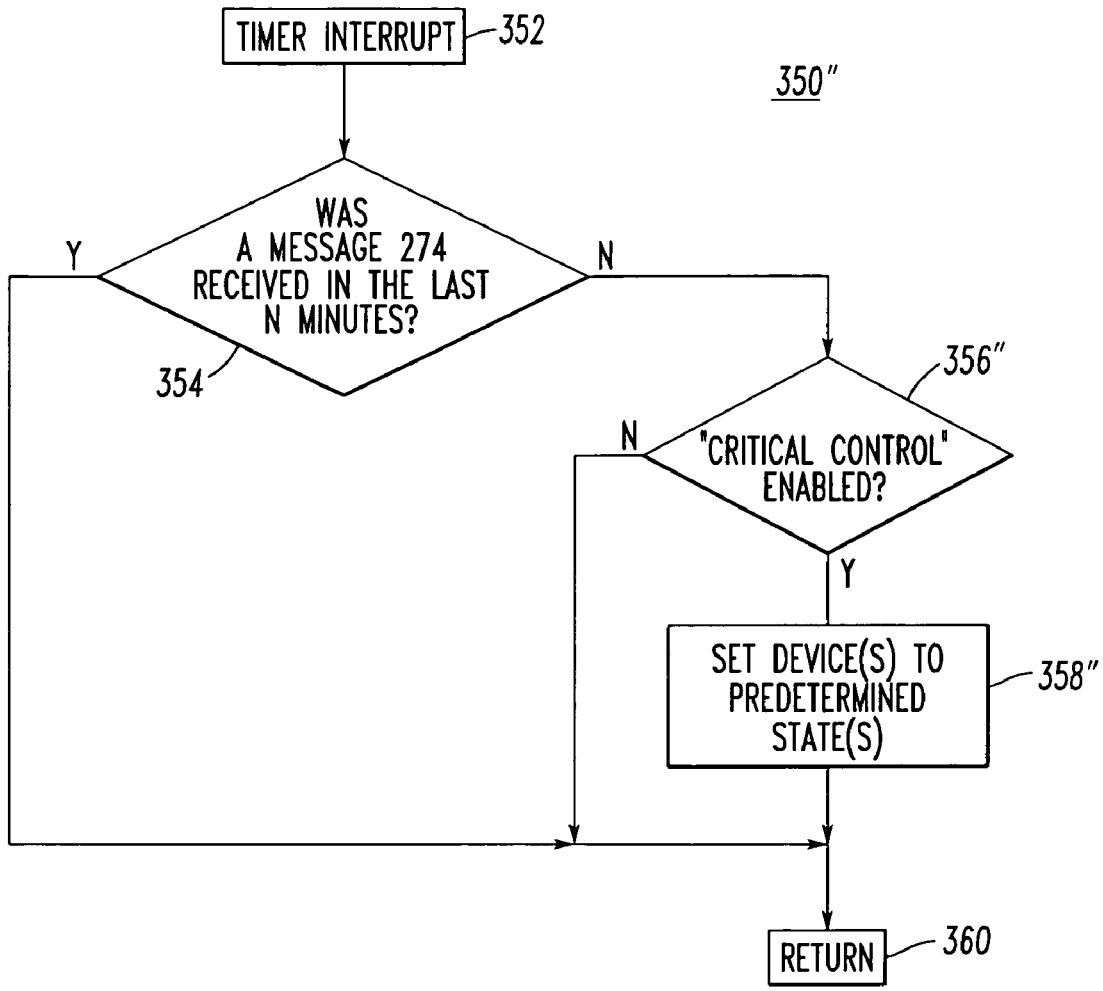
FIG. 10 is a flowchart of software executed by the base station of FIG. 2B.

FIG. 10 shows a flowchart of a software routine 350" executed by the base PIC processor 22 of FIG. 2B. In response to detecting that the fob 6 is out of range, the base station 46 cannot send alerts to the modem 50 (FIG. 2A) or to the USB channel (not shown), since there is none. However, in this example, like Example 7, the base station 46 may cause, for example, one or more doors to be auto-locked and/or one or more lights or appliances to be turned off through one or more corresponding output devices, such as 12 of FIG. 1. Hence, the fob's range from the base station 46 may drive a critical control function, such as, for example, locking a door.

The routine 350" is similar to the routine 350 of FIG. 8. If, at 354, it is determined that the last message 274 of FIG. 6A was not received in the predetermined time interval, then, at 356", it is determined if a "critical control" mode was enabled. If not, then the routine 350" returns at 360. Otherwise, at 358", one or more corresponding output devices, such as 12 of FIG. 1, are set to predetermined output states(s) before the routine 350" returns at 360.

EXAMPLE 9

When out of range, the fob 6 does not let the user train any device, such as 12, or sensor, such as 8,10, other than itself. Hence, the fob 6 displays, for example, "out of range, can't train device". When the fob 6 gets back into range of the base station 4, the fob's own training settings are updated with the base station 4, in order that changes the user made while away are reflected on all other fobs, such as 6A,6B, in the system 2.

EXAMPLE 10

The system 2 of FIG. 1 allows the user to chose between, for example, three basic configurations during system setup. These include: (1) "in home" alerts only in which the alerts are only delivered to a local interface, such as the fob 6; (2) "automatic call" in which the fob presence/absence detection ability of the base station 4 is employed to determine if the user is within the home or has left the area with any of the fobs 6,6A,6B (e.g., when a user leaves the area, the system 2 switches to notification via, for example, the modem 50 (FIG. 2A), the USB channel (not shown), e-mail messages or SMS (text) messages to a cellular telephone (not shown) for alerts defined by the user as "call me" alerts); and (3) "always call" in which the system defaults to notification via, for example, the modem 50 (FIG. 2A), the USB channel (not shown), e-mail messages or SMS (text) messages to a cellular telephone (not shown) for alerts defined by the user as "call me" alerts.

EXAMPLE 11

Figure 11:
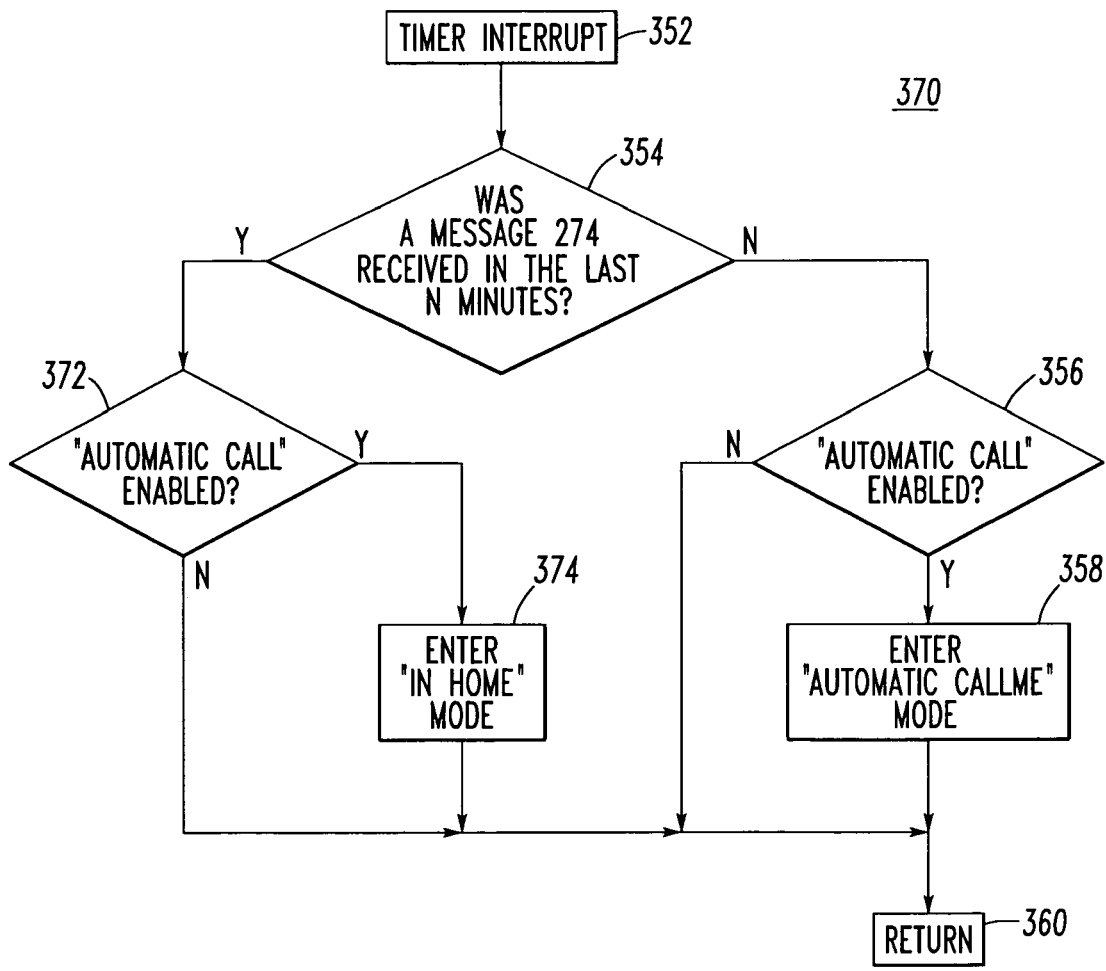
FIG. 11 is a flowchart of software executed by the base station of FIG. 1.

FIG. 11 shows a flowchart of a software routine 370 executed by the base PIC processor 22 of FIG. 2A. The routine 370 is somewhat similar to the routine 350 of FIG. 8. In addition, if, at 354, it is determined that the last message 274 of FIG. 6A was received in the predetermined time interval, then, at 372, it is determined if an "automatic call" mode was enabled. If not, then the routine 370 returns at 360. Otherwise, at 374, the base station 4 changes back over to "in home" mode 374, which sends alerts to the local interface, such as the fob 6. Finally, the routine 370 returns at 360.

EXAMPLE 12

Figure 12:
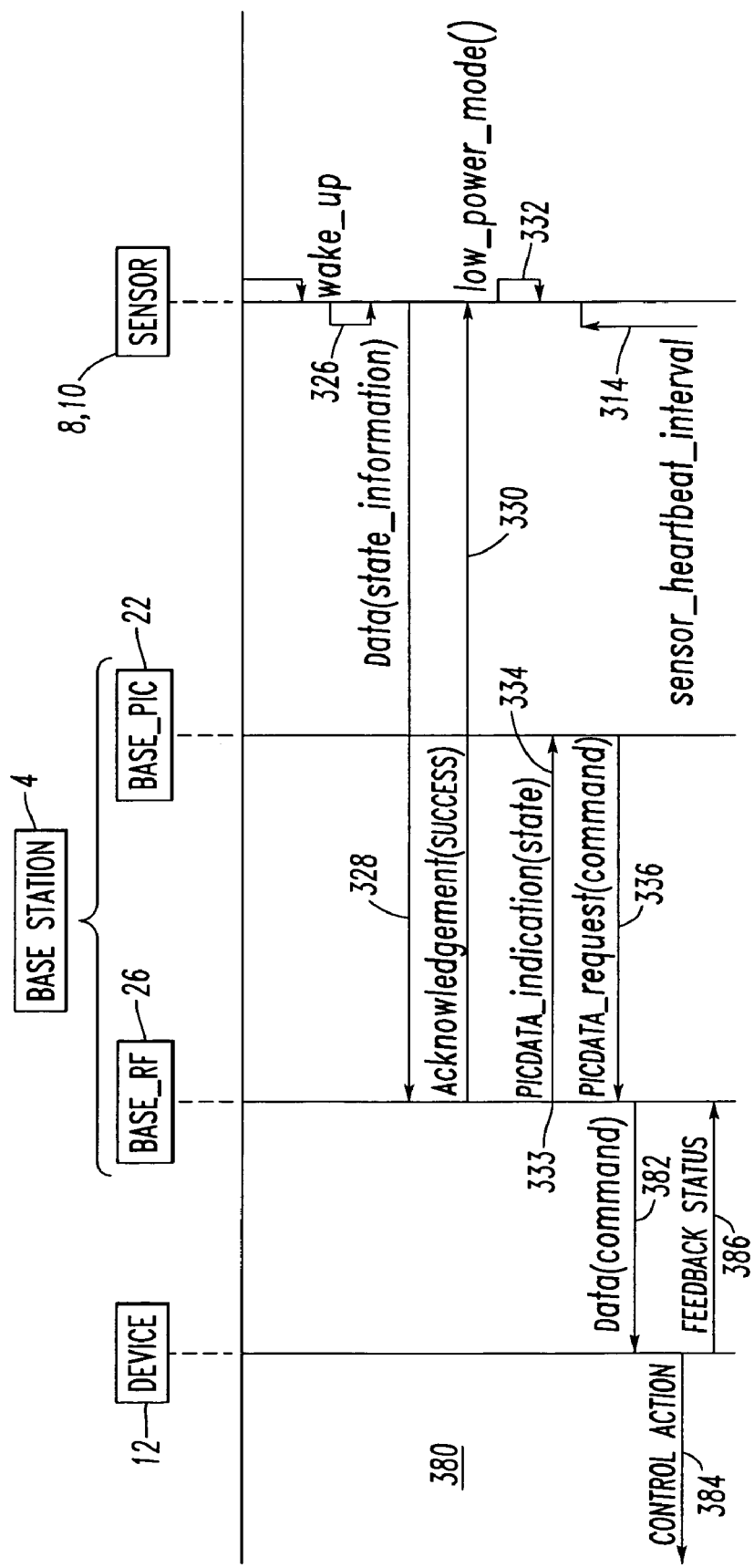
FIG. 12 is a message flow diagram showing the interaction between one of the sensors, the base station and the control device of FIG. 1 for automatically controlling that device.

FIG. 12 is a message flow diagram 380 showing various messages among one of the sensors 8,10, the base station 4 and the device 12 of FIG. 1 for monitoring that sensor and controlling that device. FIG. 12 is similar to FIG. 7B, except that message 382, control action 384 and message 386 are added. As was discussed, the sensors, such as 8,10, send state information to the base station 4 at regular (e.g., periodic) intervals, as shown in FIGS. 7B and 12, or in response to sensor state changes, as shown in FIG. 7A.

Responsive to receiving the message 334, the base station PIC processor 22 sends the PICDATA_request(command) message 336 to the base station RF processor 26. Such a command is sent, in this example, when the sensor state change corresponds to an alert condition (e.g., water detected). Finally, the base station RF processor 26 sends a Data(command) RF message 382 to the device 12. In response, that device 12 undertakes a corresponding control action 384 (e.g., close valve) and sends back feedback status 386 to the base station RF processor 26.

EXAMPLE 13

As an alternative to Examples 1, 3 and 4, a suitable signal strength or proximity sensor (e.g., without limitation, RFTAG) (not shown) in the fob 6 and a suitable sensor (not shown) in one or more doorframes (not shown) may determine if the fob 6 is "leaving" range, signal the base station 4 of this fact, and deliver a "shifting to callme" message to the fob 6.

While for clarity of disclosure reference has been made herein to the exemplary display 78 for displaying home system information, it will be appreciated that such information may be stored, printed on hard copy, be computer modified, or be combined with other data. All such processing shall be deemed to fall within the terms "display" or "displaying" as employed herein.

EXAMPLE 14

Figure 13:
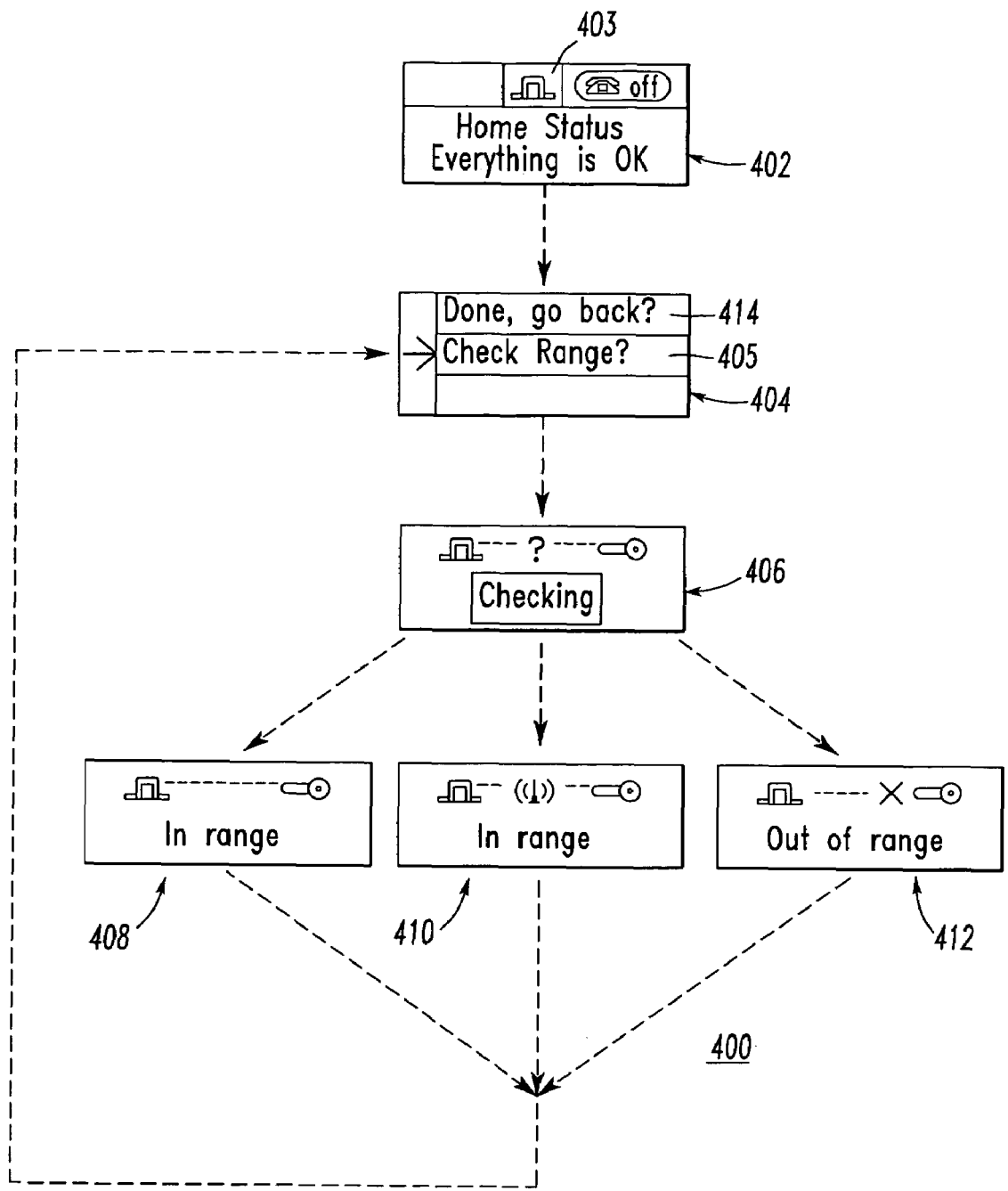
FIG. 13 is a flowchart showing various display screens employed by the fob of FIG. 3 in accordance with the present invention.

Referring to FIG. 13, a flowchart 400 shows a sequence of display screens employed by the fob 6 of FIG. 3. As will be discussed, the fob 6 includes a "range finder" function that may be advantageously employed to determine if the fob 6, a proximate sensor (e.g., 10 of FIG. 1) or another proximate node (e.g., a range extender 401 of FIG. 1) is within wireless communication range of the base station 4 of FIG. 1.

First, the user takes the fob 6 to the location of interest (e.g., the location of any node of interest; the location of the sensor 10; the location of a wall outlet (not shown) where the user wishes to locate the device 12, the range extender 401 or another node of interest). With the fob 6, at the display screen 402, the user positions the cursor (not shown) at the home status icon 403 using the encoder 76 (FIG. 3) and double-clicks the button 77 (FIG. 3). This action displays the display screen 404. Then, the user positions the cursor (not shown) at the "Check Range?" menu item 405 and clicks the button 77 to go to the range finder function. In turn, at display screen 406, the fob 6 reports that it is checking communications with the base station 4. Next, at one of the display screens 408, 410,412, the fob 6 reports the status of the communications with the base station 4. Display screen 408 shows that the fob 6 is in range of the base station 4. Display screen 410 shows that the fob 6 is in range of the base station 4, albeit communicating through a range extender (e.g., 401 of FIG. 1). Display screen 412 shows that the fob 6 is out of range of the base station 4. After any of the display screens 408,410,412, a click of the button 77 returns the fob 6 to the display screen 404.

At this point, the user may position the cursor (not shown) at the "Done, go back?" menu item 414 and click the button 77 to return to the display screen 402. This would be done, for example, if the fob 6 was in range of the base station 4 (e.g., one of the display screens 408 or 410 was displayed). Hence, the user could install the wireless node (e.g., range extender 401; sensor 10; device 12) at or about the last location of the fob 6 when the "range finder" function was last employed. Alternatively, regardless whether the fob 6 was (i.e., display screen 408 or 410 was displayed) or was not in range of the base station 4 (i.e., display screen 412 was displayed), the user may move to a different position (e.g., without limitation, closer to the base station 4; to a different point in the structure (e.g., without limitation, a home)), and re-position the cursor (not shown) at the "Check Range?" menu item 405 and re-click the button 77 to re-check the wireless communications with the base station 4.

EXAMPLE 15

Figure 14A:
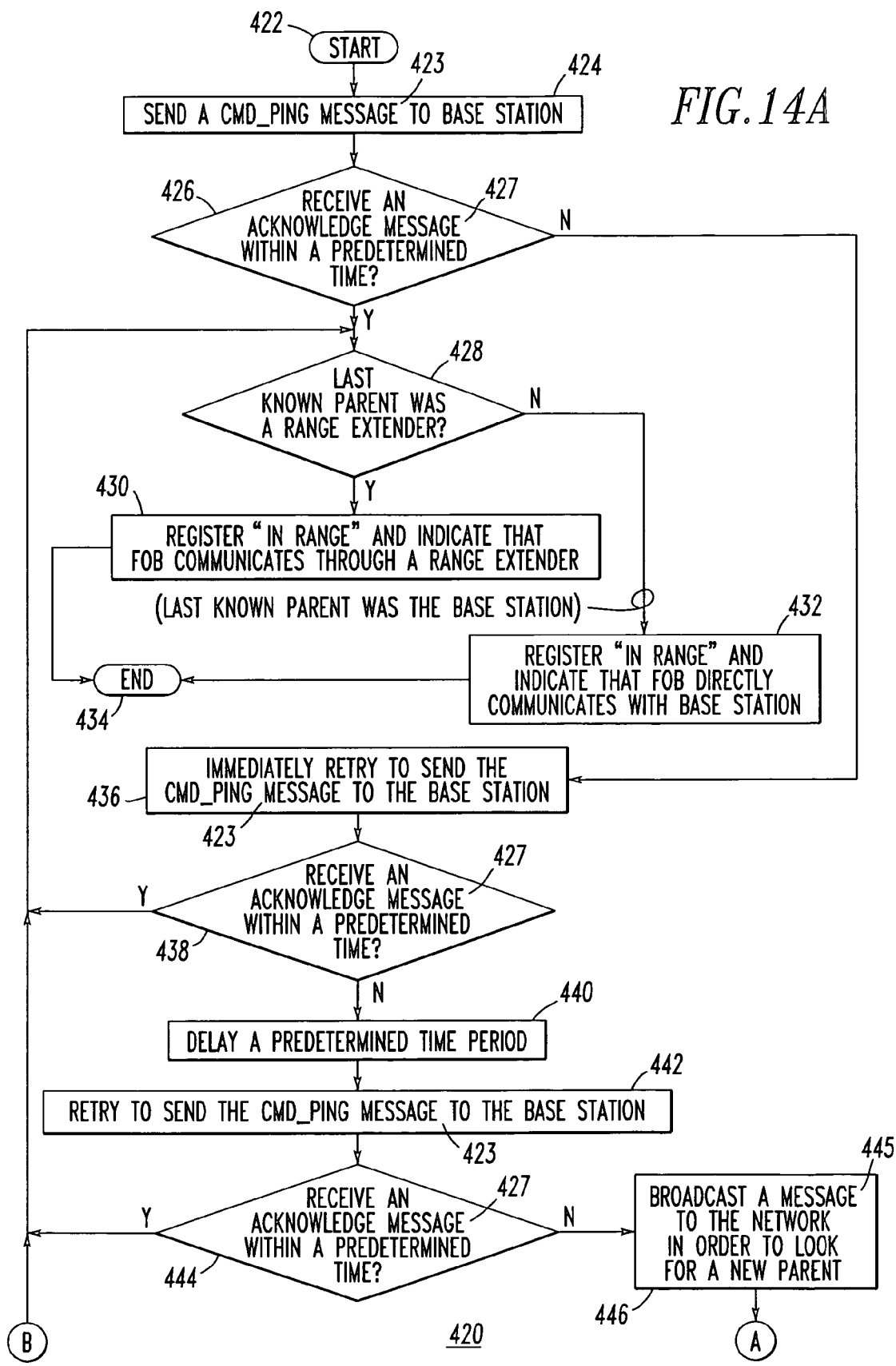
FIGS. 14A-14B form a flowchart of a software routine executed by the fob of FIG. 3 in accordance with an embodiment of the invention.
Figure 14B:
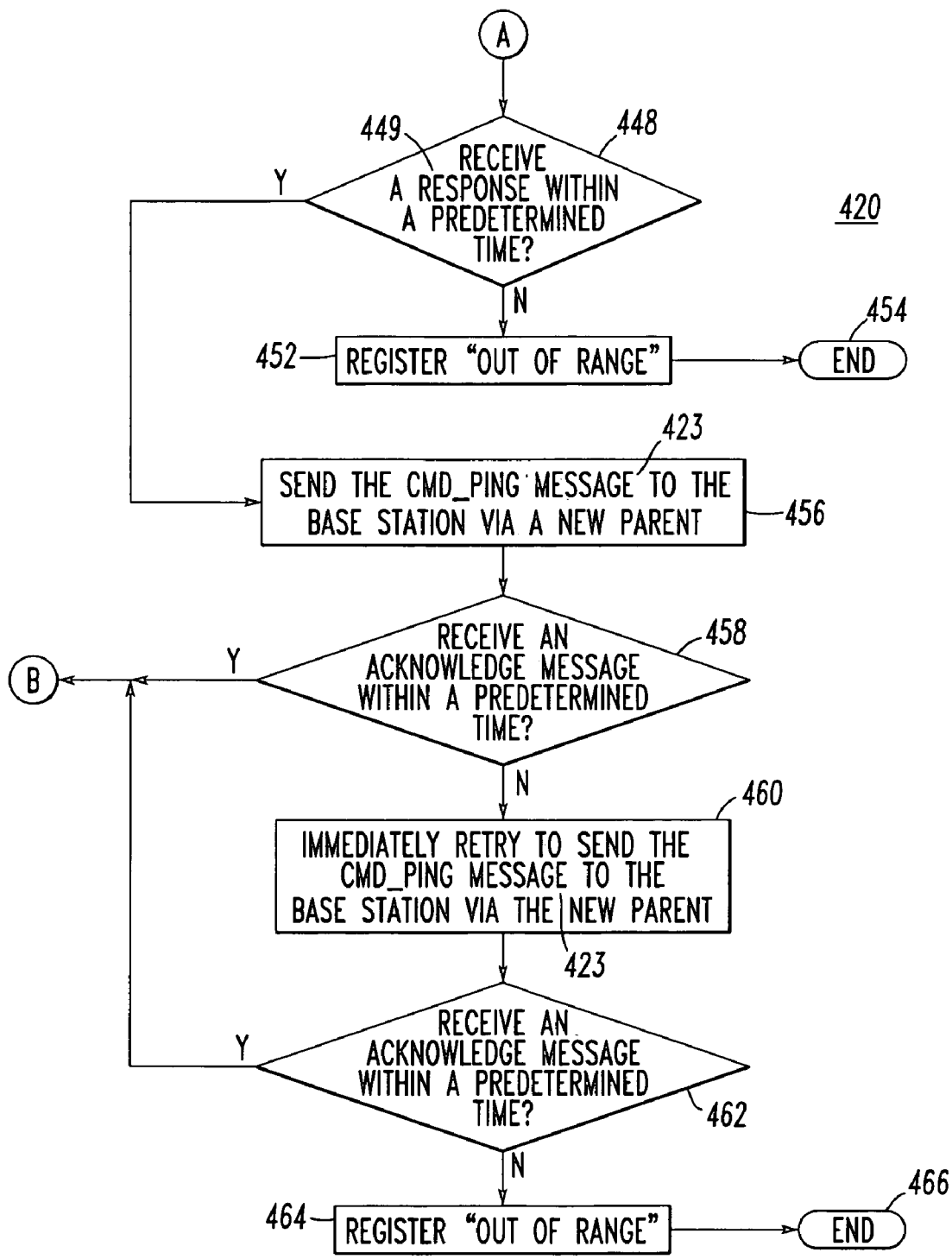

FIGS. 14A-14B show a flowchart of a software routine 420 executed by the fob 6 of FIG. 3, in order to provide the "range finder" function. After starting at 422 in response to the user selecting the "Check Range?" menu item 405 of FIG. 13, at 424, the fob 6 sends a CMD_PING wireless message 423 to the base station 4. The fob 6 sends the message 423 via the last-known parent used by the fob 6. The last-known parent is either the base station 4 (i.e., directly to the base station) or another suitable node (e.g., without limitation, the range extender 401; the device 12). When the fob 6 first joins the network 20, it recognizes the first network node to confirm its joining as its parent. This node will either be the base station 4, or a range-extending device, such as for example, the device 12 or the range extender 401 of FIG. 1. The fob 6 keeps using its current parent until communication with that parent fails. For example, during the active life of the fob 6, it may lose contact with its current parent. It then uses step 446 (below), in order to find a new parent.

If the attempt at 424 succeeds at 426 (e.g., the fob 6 receives an acknowledge wireless message 427 within about 200 ms or any suitable time period after sending the CMD_PING message 423 and, thus, the fob 6 did successfully send that message), then at 428, it is determined if the last known parent was a range extender. The last known parent is the current parent at the time that step 428 is executed. If so, then the fob 6 registers "In range" while indicating that it is communicating through a range extender (FIG. 13, display screen 410) at 430, after which the routine 420 ends at 434. Otherwise, if the last known parent was the base station 4, then the fob 6 registers "In range" while indicating that it is in direct communication with the base station 4 (FIG. 13, display screen 408) at after which the routine 420 ends at 434.

On the other hand, if the CMD_PING wireless message 423 is not successfully sent or acknowledged (e.g., the fob 6 receives no acknowledge message within about 200 ms or any suitable time period), then, at 436, the fob 6 immediately retries to send the CMD_PING message 423 to the base station 4 via the last-known parent used by the fob 6. If this attempt succeeds at 438 (e.g., the fob 6 receives an acknowledge wireless message 427 within about 200 ms or any suitable time period after sending the CMD_PING message 423 at 436), then execution resumes at 428. Otherwise, the fob 6 delays for a predetermined time (e.g., a random interval of about 750 ms to about 1000 ms; any suitable time) at 440 before retrying to send the CMD_PING wireless message 423 to the base station 4 at 442. If this attempt succeeds at 444 (e.g., the fob 6 receives an acknowledge wireless message 427 within about 200 ms or any suitable time period after sending the CMD_PING message 423 at 442), then execution resumes at 428. Otherwise, at 446, the fob 6 broadcasts a wireless message 445 to the network 20 (FIG. 1) in order to look for a new parent.

If this attempt succeeds at 448 (e.g., the fob 6 receives a wireless response message 449 within about 4 seconds or any suitable time period after sending the message 445 at 446), then execution resumes at 456. Otherwise, if this attempt fails, then the fob 6 registers "Out of range" (FIG. 13, display screen 412) at 452 before the routine 420 ends at 454.

If the attempt succeeds at 448 and a new parent is found, then, at 456, the fob 6 tries to send the CMD_PING message 423 via the new parent, which is either directly to the base station 4 or through another suitable node. If this attempt succeeds (e.g., the fob receives an acknowledge message within about 200 ms or any suitable time period), then execution resumes at 428 of FIG. 14A. On the other hand, if the attempt fails, then the fob 6 immediately retries at 460 to send the CMD_PING message 423 to the base station 4 via the new parent. At 462, if this attempt succeeds, then execution resumes at 428 of FIG. 14A. Otherwise, if this attempt fails and the fob 6 has not successfully sent the CMD_PING message 423, then, at 464, the fob 6 registers "Out of range" (FIG. 13, display screen 412) before the routine 420 ends at 466.

In the example "range finder" mode, the fob 6 sends one or more messages 423 to the base station 4. If the fob 6 timely receives the acknowledge message 427 from the base station 4, then the fob 6 knows that it is in range and can quickly inform the user of this state. With user involvement, this mode potentially has a faster message rate and, thus, a higher power consumption than the "normal" out of range detection, which occurs typically once per minute. This feature enables the user to confirm that the fob 6 (or a nearby node of interest) is still in range of the wireless network 20 and the base station 4 after the wireless node of interest (and the fob 6) has been placed at its desired location.

EXAMPLE 16

The range extender 401 may be similar to the device 12 of FIG. 4, except that the range extender 401 preferably includes no physical output, such as control output 116, that responds to a control action. Like the device 12, the range extender 401 enables the network 20 to provide an adhoc, multihop capability, in which the sensors 8,10, the device 12 and the fob 6 do not have to be within range of the base station 4, in order to communicate. Thus, the range extender 401 wirelessly repeats a wireless message between two or more of the wireless nodes of the network 20.

The fob display screens 408,410,412 readily convey explicit information to the user as to whether the fob 6 (or a proximate wireless node of interest) is in range or out of range of wireless communication with the base station 4. Thus, the user need not interpret a blink code or an indicator color on the wireless node of interest (e.g., sensor). This eliminates the cost of indicators (e.g., LEDs) for each sensor and allows the user to "walk around" and easily determine the perimeter of the wireless network 20 and to determine if the range extender 401 is needed and, if so, where to locate the range extender.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A system comprising:
a server comprising a first wireless communication port;
a fob comprising a user input device, a display and a second wireless communication port structured to communicate with the first wireless communication port of said server; and
at least one node different than said fob, said at least one node being at least one of a sensor node, a device node and a range extender node, said at least one node comprising a third wireless communication port structured to send information to or receive information from the first wireless communication port of said server,
wherein said fob is structured to respond to said user input device and determine if said fob is in range or out of range of wireless communication with said server,
wherein said fob is further structured to directly wirelessly communicate with said server through said first and second wireless communication ports or to indirectly wirelessly communicate with said server through at least one of said at least one node different than said fob,
wherein said fob is further structured to display a status corresponding to said in range or out of range determination on said display, and
wherein said fob is further structured to display a first status corresponding to said in range determination when said fob directly wirelessly communicates with said server, display a second status corresponding to said in range determination when said fob indirectly wirelessly communicates with said server, and display a third status corresponding to said out of range determination.

2. A wireless node structured to wirelessly communicate with a wireless server or at least one node different than said wireless node, said wireless node comprising:
a user input device;
a display;
a processor; and
a wireless communication port structured to communicate with said wireless server or said at least one node,
wherein said processor is structured to respond to said user input device and determine if said wireless node is in range or out of range of wireless communication with said wireless server,
wherein said processor is further structured to directly wirelessly communicate with said server or to indirectly wirelessly communicate with said server through at least one of said at least one node different than said wireless node,
wherein said processor is further structured to display a status corresponding to said in range or out of range determination on said display, and
wherein said processor is further structured to display a first status corresponding to said in range determination when said processor directly wirelessly communicates with said server, display a second status corresponding to said in range determination when said processor indirectly wirelessly communicates with said server, and display a third status corresponding to said out of range determination when said wireless communication port is out of range of wireless communication with said wireless server.

3. A method of determining if a wireless node is in range or out of range of wireless communication wit a server, said method comprising:
receiving input from a user input device;
sending a first wireless message to said server responsive to said received input;
attempting to receive a second wireless message from said server within a predetermined time after said sending a first wireless message to said server and responsively determining if said wireless node is in range or out of range of wireless communication with said server; and
further comprising displaying a first status corresponding to said in range determination when said wireless node directly wirelessly communicates with said server, displaying a second status corresponding to said in range determination when said wireless node indirectly wirelessly communicates with said server, and displaying a third status corresponding to said out of range determination when said wireless node is out of range of wireless communication with said sewer.

4. A method of determining if a wireless node is in range or out of range of wireless communication with a server, said method comprising:
receiving input from a user input device;
sending a first wireless message to said server responsive to said received input;
attempting to receive a second wireless message from said server within a predetermined time after said sending a first wireless message to said server and responsively determining if said wireless node is in range or out of range of wireless communication with said server; and
comprising failing to receive said second wireless message, broadcasting a third wireless message, receiving a fourth wireless message responsive to said third wireless message, sending a fifth wireless message to said server through another wireless node responsive to said fourth wireless message, and attempting to receive a sixth wireless message from said server within a predetermined time after said sending said fifth wireless message to said server and responsively determining if said wireless node is in range or out of range of wireless communication with said server.

* * * * *